United States Patent [19]

Levoy

[11] 4,047,093
[45] Sept. 6, 1977

[54] DIRECT THERMAL-ELECTRIC CONVERSION FOR GEOTHERMAL ENERGY RECOVERY

[76] Inventor: Larry Levoy, 799 36th Ave., San Francisco, Calif. 94121

[21] Appl. No.: 614,319

[22] Filed: Sept. 17, 1975

[51] Int. Cl.² .............................................. H01J 45/00
[52] U.S. Cl. .................................. 322/2 R; 310/306; 60/641; 165/105
[58] Field of Search .................... 165/105, 45; 60/641; 310/4; 322/2

[56] References Cited

U.S. PATENT DOCUMENTS

| | | | |
|---|---|---|---|
| 3,302,042 | 1/1967 | Grover et al. | 310/4 |
| 3,441,752 | 4/1969 | Grover et al. | 310/4 |
| 3,834,171 | 9/1974 | Johansson | 165/105 |
| 3,857,244 | 12/1974 | Faucette | 165/45 X |
| 3,864,917 | 2/1975 | Jacoby | 60/641 |
| 3,911,683 | 10/1975 | Wolf | 60/641 |

*Primary Examiner*—Donovan F. Duggan
*Attorney, Agent, or Firm*—David E. Newhouse

[57] ABSTRACT

Direct conversion systems for in situ conversion of geothermal energy into electricity are described in which thermoelectric generators and/or thermionic convertors directly convert the earth's thermal energy into electrical energy. The choice of a thermoelectric or thermionic system is dictated by the temperature domain of the particular geothermal formation.

The basic unit of the described system includes at least two coaxially-intersecting heat pipes, extending between a high temperature geological strata and a low temperature geological strata. Thermal-electric energy conversion devices are positioned within an annulus between the intersecting heat pipes.

39 Claims, 10 Drawing Figures

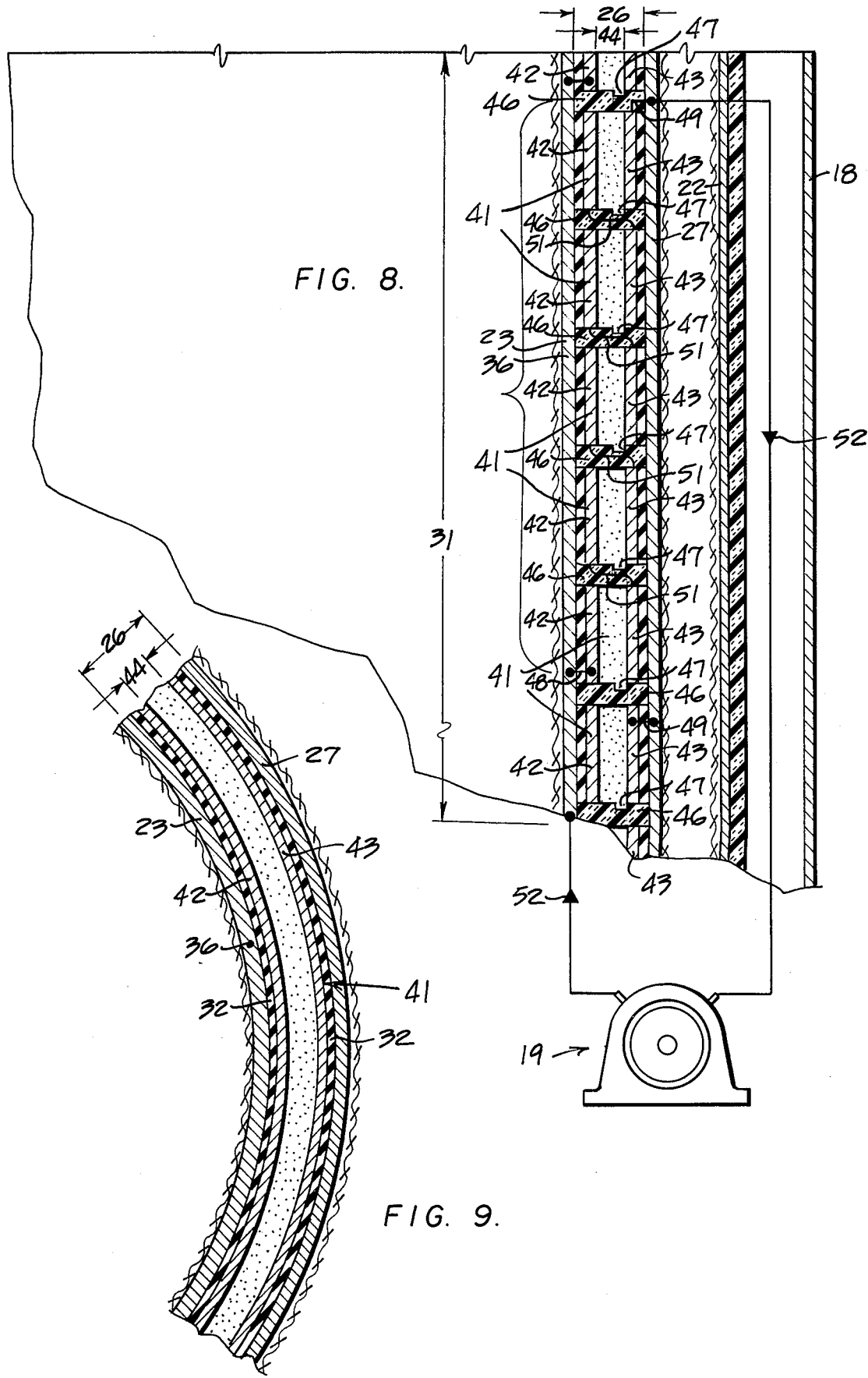

DIRECT THERMAL-ELECTRIC CONVERSION FOR GEOTHERMAL ENERGY RECOVERY

BACKGROUND OF THE INVENTION

1. Field of the Invention

The invention relates to direct thermal-to-electric energy conversion systems for in situ recovery of underground geothermal energy.

2. Description of Prior Art

High temperature geological areas, commonly referred to as geothermal areas, exist throughout the world. Geothermal areas are created by an intrusion of molten material into fractures and/or defects in the earth's crust to a point relatively near the earth's surface. The upwelling molten material (magma) often exists in large chambers, the uppermost portion of which are geologically proximate to the earth's surface. (3 to 20 km).

The magma chambers are fairly stable structures and contain an enormous amount of heat energy. The molten material within the chamber is believed to be at temperatures between 1200° C and 1800° C.

Heat energy of the magma in a chamber dissipates slowly, if at all, because of the very poor thermal conductive properties of the solid rock materials surrounding it. Recent investigations suggest a convective communication between the chambers and molten material in the earth's asthenosphere. In fact, it has been suggested that the chambers are in reality created by a circulatory plume of molten material. If such is the case, then heat energy dissipating from the chamber by conduction is replenished by the convective mechanisms between the chamber and the asthenosphere. Also poor thermal conduction properties of solid rock materials limits dissipation of the heat energy of the magma chamber to geographically local areas.

Often geological formations containing water occur proximate a magma chamber. In such occurences heat energy diffusing from the chamber heats and/or vaporizes water of such formations. The water vapor then diffuses to the earth's surface through fractures and defects in geological formations thereabove. The diffusing water vapor is believed to be the source of hot springs, geysers and the like. Such areas are commonly referred to as aqueous geothermal areas.

Where there are no water-bearing or aqueous geological formations proximate a magma chamber, heat dissipates by normal conduction through the surrounding solid rock materials. Such geothermal areas are commonly referred to as hot rock or "dry" geothermal areas.

Heat from aqueous geothermal areas has long been used as a source of energy of human societies. For example, the escaping steam or hot water has been used to heat buildings, wash clothes, cook food and the like.

However, because of the local geographic nature of such geothermal energy phenomenon, the total energy potential of geothermal energy sources have not been utilized as a major energy source by modern societies. Specifically, to utilize effectively the energy potential of a geothermal energy source, the thermal energy must be converted into a more distributable form of energy such as electricity.

Existing systems for converting geothermal energy into electricity are hydothermal systems. Specifically, in aqueous geothermal areas, a well is drilled into the formations for producing steam or hot brine. The steam and/or hot brine is then utilized to drive a conventional turbine-driven generator. In some instances, the steam escaping from the geological formation forms the primary fluid driving the generator system. Such areas are commonly referred to as dry steam systems. Typical examples of such dry steam systems are those located in the Larderello area of Italy and the Geysers area of California.

The brine or hot water systems are far more common. In such systems, the hot water or brine is utilized as a secondary fluid to heat primary fluid for driving a turbine generator. A typical example of a brine system is the Salton Sea area in California.

In both the dry steam and brine systems, the escaping fluid is reinjected back into the formation usually via a second well.

For dry geothermal areas, a system of wells is drilled into the formation and a fluid, such as water, is introduced for heating. A second system of wells is drilled into the formation for collecting the heated or vaporized water which is then utilized to drive a turbine generator, and the cooled fluid is recirculated back into the formation via the first system of wells.

Hydrothermal energy recovery systems of geothermal energy sources have limitations. For example, the circulating fluid (water) often dissolves large quantities of minerals and becomes very corrosive. The dissolved minerals also often precipitate out as the fluid escapes or is pumped from underground. The precipitating minerals can effectively plug the well.

The primary disadvantages of a hydrothermal-convective energy recovery system for geothermal energy sources relates to the relatively low operating temperature (250° C to 600° C). Because of such low temperatures the resultant steam is usually not sufficiently super-heated for efficiently driving turbine generators.

In addition, temperatures of hydrothermal-convection systems are largely determined by the ability of the involved geological formations to contain the heated fluid. If the formations are "tight" then unlimited expansion of the fluid is prevented and the temperature of the fluid increases. On the other hand, if the formations are not "tight" then expansion occurs lowering the temperature of the fluid. Also substantial heat energy is lost as latent heat of vaporization. In brine systems the temperature is determined by the boiling temperature of the brine.

Another complex problem in recovering energy from geothermal formations is created by the poor thermal conduction properties of solid rock materials. Specifically, an energy recovery system which removes thermal energy from hot rock at a rate greater than the rate of heat flow through the surrounding rock effectively insulates itself from the energy source. More concisely, the rate of heat conduction through the solid rock materials limits the rate of recovery of thermal energy from a geothermal energy source. Accordingly, a geothermal energy recovery system should be optimized for the particular thermal conduction properties of the rock formations within the geothermal region.

SUMMARY OF THE INVENTION

Direct conversion systems for in situ conversion of geothermal energy into electricity are described in which thermoelectric generators and/or thermionic converters directly convert the earth's thermal energy into a direct electrical current underground, which electrical current is then utilized to drive conventional D/C-to-A/C generators on the surface.

Specifically, thermionic conversion devices theoretically can generate up to 100 amps/cm² when operated at temperatures ranging between 1200° C. and 2200° C., which encompasses the temperature domains at which molten and near-molten rock is thought to exist. Thermoelectric generators efficiently operate at temperatures between 200° C. and 1000° C which encompasses the temperature domain of most known geothermal areas.

The primary advantage of direct thermal to electric energy conversion for recovering geothermal energy over hydrothermal-convective systems relates to the elimination of the latent heat of vaporization energy loss.

Another advantage of direct thermal to electric energy conversion systems for geothermal energy recovery relates to the passive nature of such systems. Specifically, neither thermionic convertors, nor thermoelectric generators have any mechanically moving elements.

Another advantage of direct thermal to electric conversion systems relates to the integrity of the conversion devices at high temperatures.

Still another advantage of the invented in situ direct conversion energy recovery system relates to elimination of adverse environmental effects on the ground surface normally associated with hydrothermal-convective recovery systems.

Another advantage of the invented geothermal energy conversion system is that it is ideally suited to the rate of heat flow through solid rock materials. Specifically, thermionic convertors and thermoelectric generators, do not require high heat fluxes for efficient operation. Accordingly, such devices will not effectively insulate themselves from the geothermal energy source.

Finally, the low conversion efficiencies of direct thermal to electric conversion devices are a negligible factor in view of the enormous magnitude of heat energy available in geothermal energy source.

Another aspect of the invented direct thermal to electric conversion system for in situ recovery of geothermal energy relates to a novel arrangement of heat pipes to provide the necessary temperature differential for driving the thermal to electric conversion devices. In particular, thermal-electric conversion devices are located in an annulus between two coaxially intersecting heat pipes. The high temperature heat pipe extends downward from the coaxial section into a high temperature geological strata while the low temperature heat pipe extends upward from the coaxial section into a low temperature geological strata. The temperature difference between the two heat pipes is sufficient to drive thermal-electric devices.

A unique advantage of the described direct conversion system is that it can exist in combination with hydrothermal-convective systems. Specifically, the hydrothermal-convective system would provide a very efficient heat sink for the low temperature heat pipe. The heat pipe would also provide relatively efficient heat transfer from the high temperature formation.

Still another aspect of the present invention relates to establishing a network of wells each penetrating into a high temperature geological formation wherein each well has a plurality of in situ conversion units. The electrical outputs of the wells are connected in parallel to provide sufficient power for driving D/C-to-A/C generators.

Other novel aspects of the invention relate to the structural configurations and orientations of the thermal-electric conversion devices within the annulus between the coaxially intersecting high temperatures and low temperature heat pipes.

Still other novel aspects of the present invention relate to the particular structural composition of the heat pipes which enables them to be utilized as electrical conductors.

DESCRIPTION OF THE FIGURES

FIG. 8 is an enlarged vertical cross-sectional view of an exemplary thermionic generating unit located in the annulus between the high and low temperature heat pipes.

FIG. 9 is an enlarged horizontal cross-sectional view of a section of a thermionic convertor disposed in the annulus between the high and low temperature heat pipes.

DETAILED DESCRIPTION OF EXEMPLARY EMBODIMENTS

Figure 1:
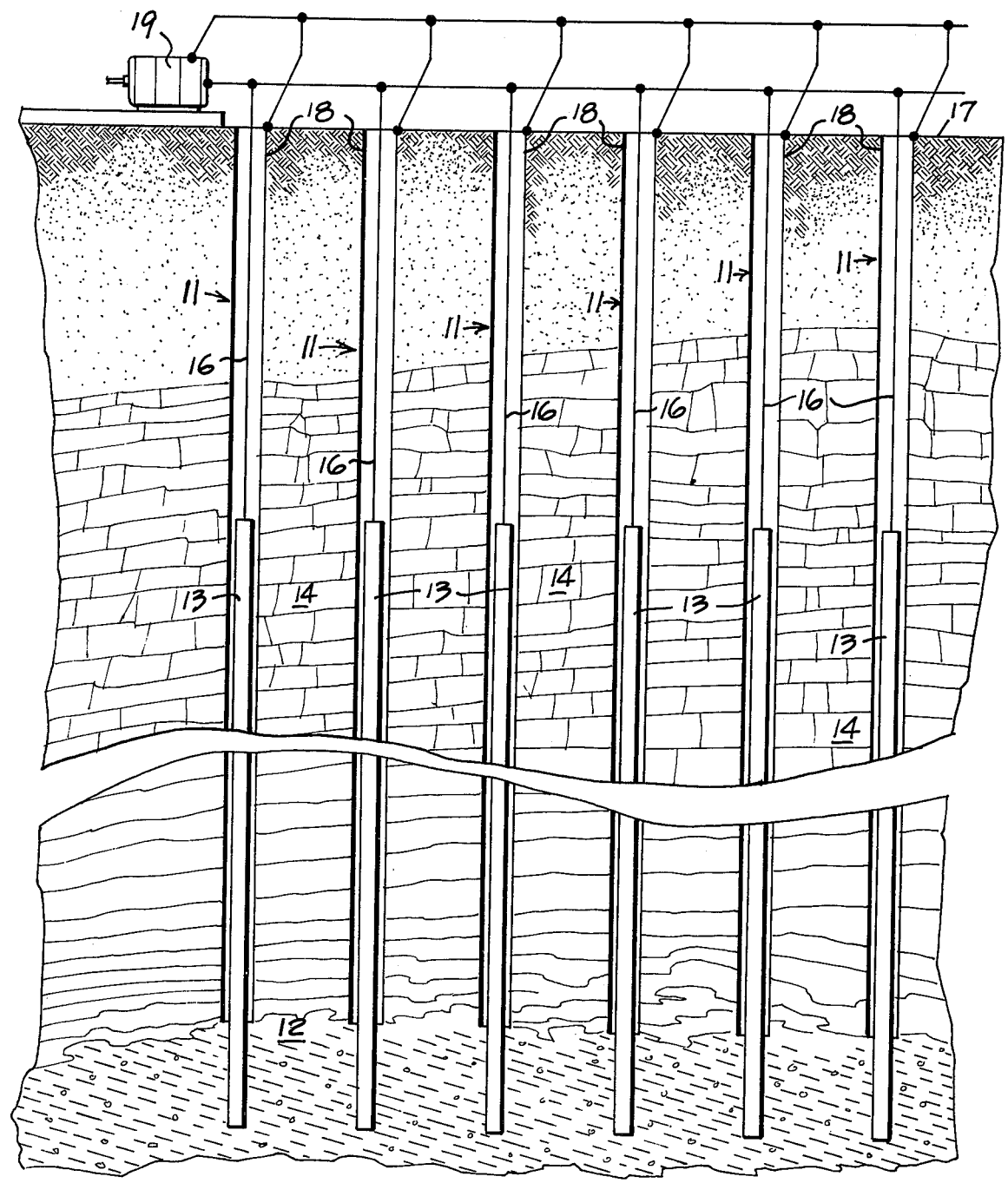
FIG. 1 shows a vertical cross-section of an array of geothermal wells having direct thermal-electric conversion systems electrically connected for driving a D/C-to-A/C generator.

FIG. 1 shows a vertical cross-sectional view of an array of geothermal wells 11 penetrating downward into a high temperature geological strata 12. The direct thermal-electric energy conversion systems 13 extend between a low temperature geological strata 14 and the bottoms of the wells 11. A central insulated conductive rod 16 extends from the top of the conversion systems 13 to the ground surface 17. Each well 11 further includes a conductive well casing 18 along its entire length.

Figure 2:
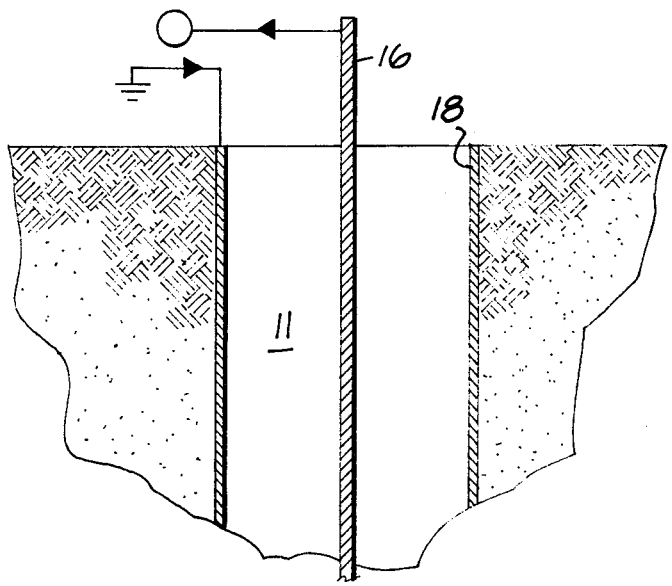
FIG. 2 is an enlarged cross-sectional view of a well head showing the respective electrically conductive elements.

Referring to FIG. 2, the well casing 18 in addition to providing structural integrity to the well also provides a good ground or reference potential for the systems. The central insulated conductive rods 16 carry the electrical current generated by the conversion systems 13. The well casings 8 and the central conductive rods 16 of the separate wells 11 are electrically connected in parallel for a conventional D/C-to-A/C generator 19 on the ground surface 17. (See FIG. 1).

In more detail, the direct thermal-electric conversion systems 13 each include a plurality of heat pipes. In context of this disclosure, the term "heat pipe" refers to a closed volume structure containing a two-phase working fluid for conveying thermal energy from a heat source to a heat sink as latent heat of vaporization. The heat pipes all have a generally cylindrical configuration with a longitudinal axis, aligned parallel to the axis of the well.

Specifically, a heat pipe is a simple, highly efficient heat-transfer device that can transfer several hundred times as much heat as metal conductors of the same cross-section. They consist of tubular chambers with a capillary-wick structure 21 on the inner wall and a two-phase working fluid. Heat is transferred by evaporating the fluid in the heating zone and condensing it in the cooling zone. Circulation is then completed by return flow of the condensate to the heating zone through the capillary structure. Because of this two-phase action, the heat pipe is nearly isothermal with little loss along its length, and is, therefore, highly efficient. Heat pipes can be straight, curved, circular, or corkscrew in shape with round, square, elliptical or rectangular cross-sections. They can be made to go over, under or around components. They can be built to operate over several temperature ranges from cyrogenic to about 3000° C., although no single heat pipe operates efficiently over this entire range. The working fluid can be liquid oxygen, nitrogen or helium in the cyrogenic range, water (77° C), potassium (580° C), sodium (970° C) and lithium, lead or silver (1,640°). A heat pipe less than one inch in diameter using water can transport 1 Kw(t). With a metallic fluid it can transport up to 10 Kw(t). In the high temperature ranges, the wick material 21 must be compatible with the fluid, and common refractory metals such as tantalum, tungsten, molybdenum and rhenium are often used. The heat pipe principal was first conceived by R. S. Gaugler of General Motors in 1942 and applied by G. M. Groven of Los Alamos Scientific Laboratory in 1963 as a method of transferring reactor heat in space power systems. Heat pipes are now commonly contemplated as heat transfer devices for space applications and nuclear reactor applications where thermionic and/or thermal-electic energy generation is contemplated.

Where the axis of a heat pipe is oriented along a gravitational force gradient, the capillary action of the wicking structure 21 aids the gravitational forces in returning the liquid-phase fluid to the heat source provided the heat source is below the heat sink. In these cases, the primary utility of the wicking structure 21 is to separate the respective flows of the vapor and liquid phases of the working fluid.

Figure 3:
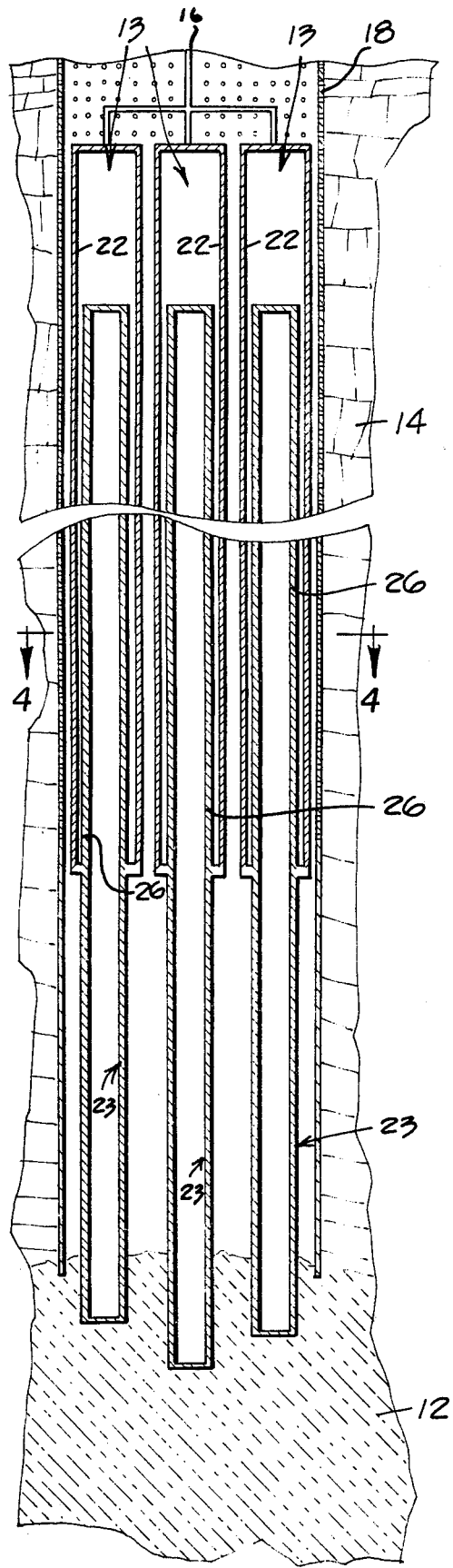
FIG. 3 is a vertical cross-sectional view of the conversion system of a single well showing a plurality of conversion units.
Figure 4:
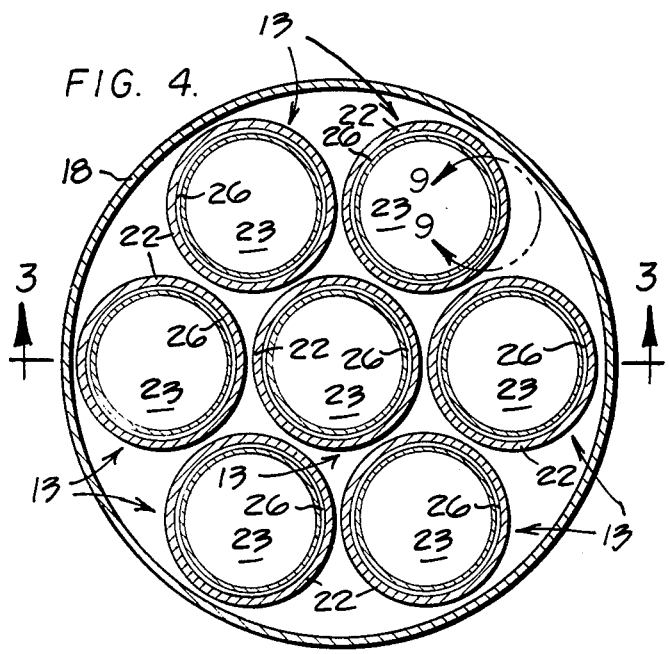
FIG. 4 is a view taken along 4—4 of FIG. 3.

Referring now to FIGS. 3 and 4, the conversion systems 13 each include a pluarlity of low temperature heat pipes 22 thermally coupled by a suitable medium such as water to a low temperature geological strata 14. High temperature heat pipes 23 thermally coupled to the high temperature geological strata 12 by a suitable medium other than water extend upward from the well bottom where they are coaxially received within the low temperature heat pipes 22.

As depicted in FIG. 3, the low temperature heat pipes 22 function as the heat sink for the high temperature heat pipes 23. The ultimate heat source for the heat pipes 22 and 23 is the high temperature geological strata 12. The ultimate heat sink for the heat pipes 22 and 23 is the low temperature geological strata 14. The thermal-electric conversion devices 24 are positioned in the annulus 26 defined between the coaxially-intersecting sections of the high and low temperature heat pipes 23 and 22 respectively. In more detail, referring to FIGS. 5, 6 and 7, each low temperature heat pipe 22 is a closed cylindrical structure composed of an electrically conductive structural material 27 such as high temperature alloys of stainless steel and the like. Each low temperature heat pipe 22 is divided into two zones, the heating zone 28 and the cooling zone 29. With reference to FIG. 6, the heating zone 29 of each low temperature heat pipe 22 is the annular volume surrounding the conversion devices 24. The cooling zone of each low temperature heat pipe is the cylindrical volume of the structure which exits between the top of each high temperature heat pipe 23 received coaxially therein and the top of each low temperature heat pipe.

The interior surface of each low temperature heat pipe includes an integral wicking structure 21 formed by, for example, closely spaced inwardly extending fins. Alternatively, the wicking structure 21 may be a mesh of structural material fastened to the interior surface of the pipe to form a suitable capillary structure.

Since each low temperature heat pipe 22 also functions as an electrical conductor, the cooling zone of each pipe 22 is coated with an electricaly insulating, thermally conductive material 32. Suitable electrically insulating thermally conductive materials largely depend upon the temperature domain in which they exist. For example, in temperature ranges between 600° to 1000° C., suitable materials include the ceramics alumina ($AL_2O_3$) and berryllia (BeO). A comprehensive discussion of electrically insulating thermally conductive materials is presented infra.

In temperature domains below 600° C., suitable materials 32 include the ceramins alumina $Al_2O_3$), beryllia (BeO) and boron nitride (BN). (See discussion infra).

In contrast, the exterior surface of the heating zone 28 of each low temperature heat pipe 22 is coated with an electrically and thermally insulating material 33. Again, suitable electrically and thermally insulating materials 33 depend upon the temperature domain in which they exist. Where the temperature domain ranges between 1000° to 1500° C., suitable materials include the ceramics zirconia ($ZrO_2$), fosterite ($2MgO.SiO_2$) and thoria ($ThO_2$).

In temperature ranges between 600° to 1000° C., suitable electrically and thermally insulative materials include the ceramics zirconia ($ZrO_2$) and fosterite ($2MgO.SiO_2$).

Below 600° C., suitable electrically and thermally insulating materials 33 include the ceramic zirconia ($ZrO_2$). (See discussion infra).

Figure 5:
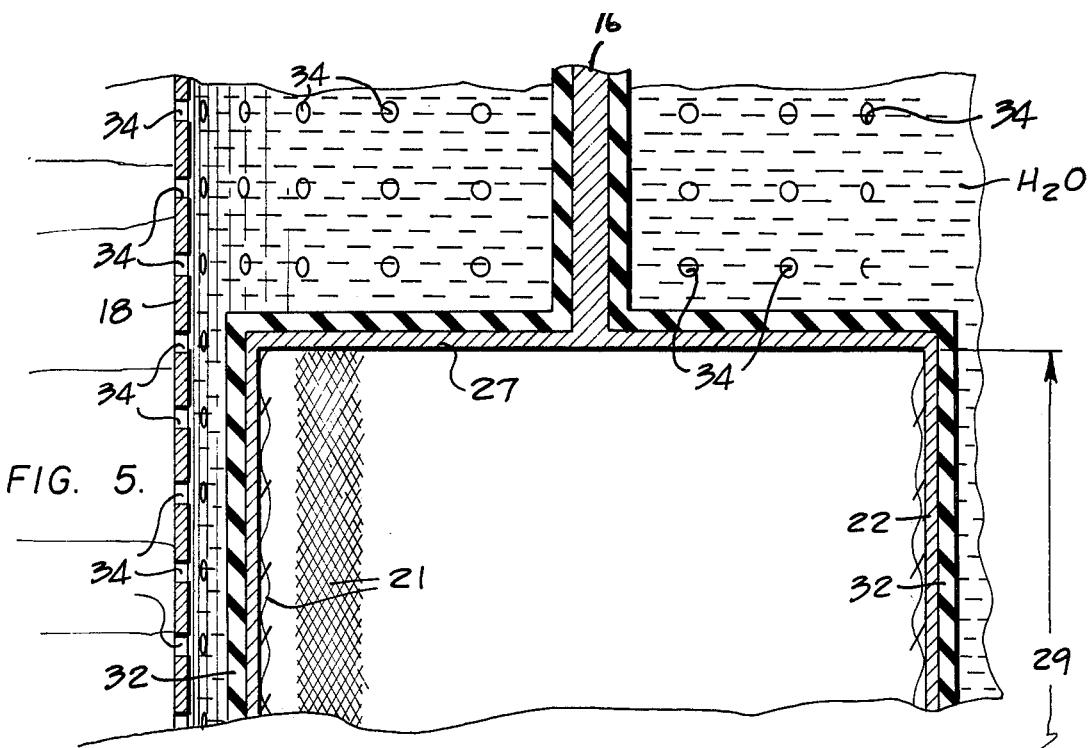
FIG. 5 is an enlarged vertical cross-sectional view of the top of a low temperature heat pipe showing its relationship to the well casing and the conductive rod connected thereto.
Figure 6:
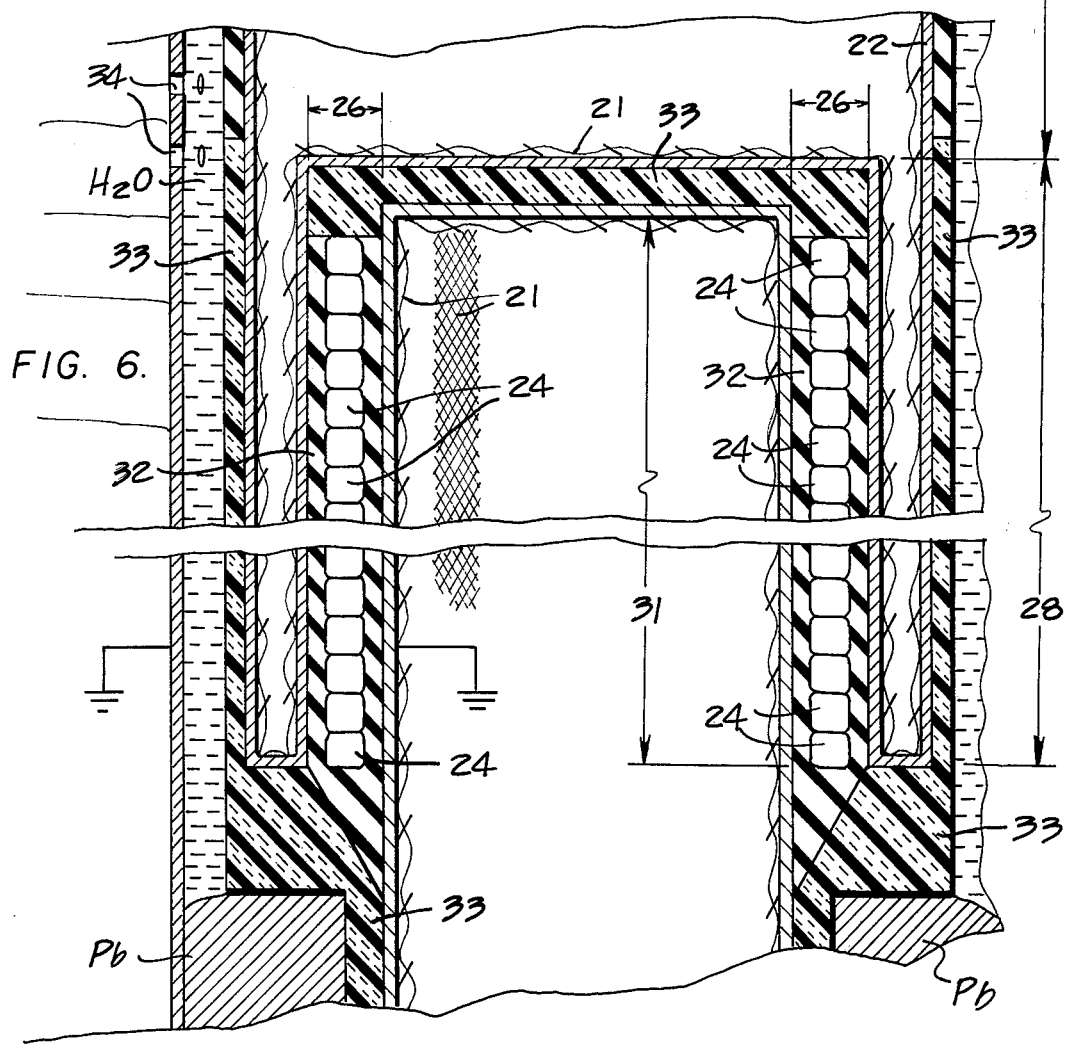
FIG. 6 is a vertical cross-sectional view showing the relationship between the well casing and the low and high temperature heat pipes.

As shown in FIG. 5 there are perforations or holes 34 through the well casing 18 proximate and above the cooling zone 29 of the low temperature heat pipes 22. The perforations 34 allow water from the low temperature geological strata to flow into the unoccupied volume of the well to cool the low temperature heat pipes 22. The water heated by the low temperature heat pipes 22 escapes back into the low temperature geological strata via perforations or holes 34 through the well casing substantially above the top of the low temperature heat pipes 22.

Alternatively, the low temperature heat pipes could be cooled by circulating a fluid such as water from the ground surface downward through the well bore into the unoccupied volume defined between the well casing 18 and the low temperature heat pipes 22. In the latter instance, the perforations 34 through the well casing should be eliminated. The low temperature heat pipes in this case would vaporize the cooling water and the heated water vapor could be utilized at the ground surface for driving a conventional hydrothermal electrical generating facility.

As depicted in FIG. 6 each high temperature heat pipe 23 basically comprises a closed cylindrical structure composed of common refractory material such as tantalum, tungsten, molybdenum and rhenium. The high temperature heat pipe is also electrically referenced to the ground or reference potential for the conversion system 13. Accordingly, care must be taken to suitably insulate the high temperature heat pipe 23 from the low temperature heat pipe 22.

The cooling zone 31 of each high temperature heat pipe is received coaxially within the heating zone of a low temperature heat pipe 22.

The conversion devices 24 disposed in the annulus 26 provide the only thermal coupling between the high temperature and low temperature heat pipes 23 and 22 respectively. Specifically, the cooling zone 31 of each high temperature heat pipe 23 is thermally insulated from the low temperature heat pipe 22 by electrically and thermally insulative materials 33 except in the area of the conversion devices 24 which are coupled to the respective heat pipes 22 and 23 by electrically insulative thermally conductive materials 32.

The current loop provided by the conversion systems 13 can be described as follows:

1. The high temperature heat pipes provide a source of electrons;
2. electrons are conveyed from the high temperature heat pipe 23 to the low temperature heat pipe 24 by the conversion devices 24;
3. the low temperature heat pipes 22 conduct the electrons to the central conductive rod 16 which conveys them to the ground surface; and
4. at the ground surface the electrons drive the D/C-to-A/C generator 19 which is grounded to the well casing.

Figure 7:
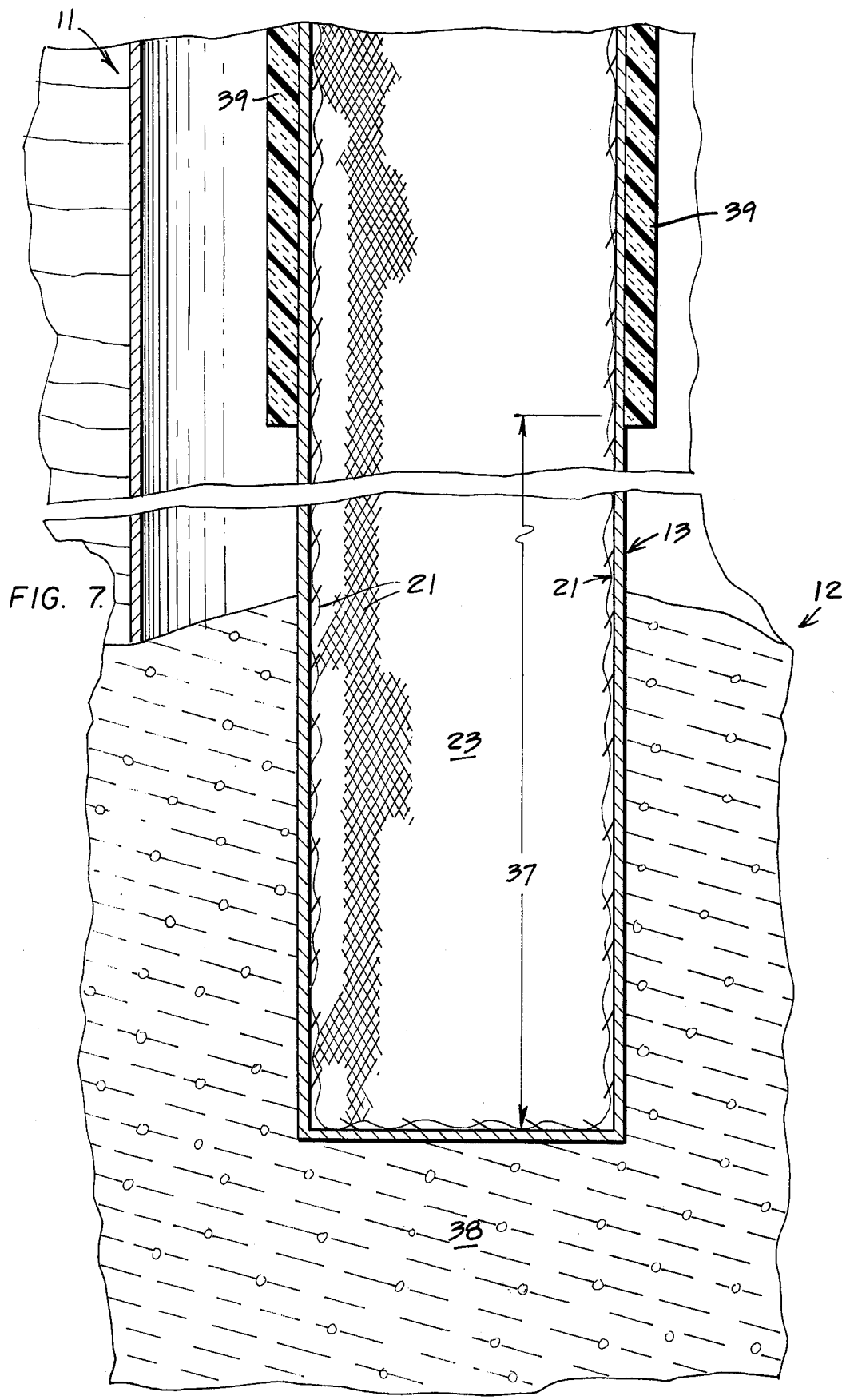
FIG. 7 is an enlarged vertical cross-sectional view at the bottom of a high temperature heat pipe.

Referring now to FIG. 7, the heating zones 37 of the high temperature heat pipes 23 extend into and are thermally coupled to the high temperature geological strata 12. Specifically, the invention contemplates the heating zones 37 extended into a region of molten or near-molten rock material (magma 38) at or proximate the top end of a large magma chamber. It is believed that the heat transferred from the magma by the heat pipes 23 will be replenished by convective currents of magma 38 within the chamber.

It is also possible that the magma 38 may flow up the well bore 11. If the magma 38 does extrude up the well bore a substantial length of the high temperature heat pipes 23 may be immersed within the magma materials. It is believed unlikely that the magma materials will actually extrude to the ground surface since such materials will ultimately encounter cooler geological strata causing it to solidify within the well bore 11 thus effectively cementing the conversion systems 13 in place.

Where the pressure of the magma material 38 in the magma chamber is sufficiently great to cause the material 38 to extrude a substantial distance up the well 11 it may be necessary to provide a counter-balancing pressure in the form of a liquid leg within the well bore. A suitable liquid would be molten lead. Specifically, at one atmosphere pressure (760 mmHg) lead liquifies above 427° C., and vaporizes above 1750° C. Accordingly, lead would be a liquid at the pressures and temperatures expected in regions proximate a magma chamber. The length of the liquid leg would be determined by the pressure domain of the strata 12 either within or proximate to the magma chamber. In any case, the liquid leg should not extend up the well 11 to a point where it would surround the cooling zone 28 of the low temperature heat pipe 23. If additional weight is required to counterbalance the magma chamber pressure for preventing extrusion of magma material 38 up the well, water, brine or drilling muds could be utilized above the leg of molten lead. If water is used, it may be circulated for cooling the top of the lead leg causing it to solidify to a solid plug which again would cement the conversion systems 13 in place within the well bore 11.

Where the high temperature geological strata is not molten or near-molten material but exists at temperatures between 500° C and 1000° C., lead may be introduced into the well to provide the thermal coupling between heating zones 37 of the high temperature heat pipes 23 and the geological strata 12. Again, the molten lead should not extend up the well to a point where it surrounds the heating zone of the low temperature heat pipes 22.

Where the high temperature geological strata 12 has temperatures below 500° C., water or brine is suggested for thermally coupling the boiling zone 36 of the high temperature heat pipe 23 to the strata 12.

Referring back to FIG. 7, it may be necessary to insulate the high temperature heat pipes with a suitable thermal insulating material 39 above the heating zones 37 in order to prevent heat loss from the heat pipe 23 as it traverses up the well passing through cooler geological zones. The thermal insulation 39 disposed around the high temperature heat pipe 23 thus insures that the thermal energy conveyed by the heat pipe is dissipated through the conversion devices 24 and not lost to the surrounding geological strata.

Where the high temperature geological strata 12 exists at temperatures below 500° C, it may also be necessary to provide means for preventing fluids circulating below the low temperature heat pipe 22 from mixing with fluids circulating around the low temperature heat pipe 22. A suggested heat means for preventing such circulation would be collar (not shown) disposed around the high temperature heat pipes 23 immediately below the point where they are coaxially received within the low temperature heat pipe 22. The collar would effectively plug or minimize cross-circulation of the fluids within the respective regions of the well bore.

The conversion devices 24 disposed in the annulus 26 between the high and low temperature heat pipes 23 and 22 respectively are either thermionic generators or thermoelectric generators depending upon the temperatures of the high and low temperature heat pipes 22 and 23. Specifically, thermionic convertors operate at temperatures ranging above 1200° C. while thermoelectric generators operate at temperatures below 700° C. A temperature difference $\Delta T$ of approximately 1000° C. is required to drive a thermionic convertor efficiently. In contrast, a temperature difference $\Delta T$ of only 100° C. is sufficient to drive a thermoelectric generator. A comprehensive discussion of the theory, properties and materials of both thermoelectric generators and thermionic convertors appears in a text titled *Nuclear Energy Conversion* by M.M. El-Wakil published in 1971 (pages 434–498).

Thermionic Conversion System

FIGS. 8 and 9 depict exemplary thermionic conversion units 41 disposed in the annulus 26 between the high and low temperature heat pipes 23 and 22. Each thermionic conversion unit 41 includes an annular emitter electrode 42 mounted coaxially around the cooling zone 31 of the high temperature heat pipe 23, an annular collector electrode 43 coaxially disposed around the emitter electrode 42, and an interelectrode space 44 between respective electrodes 42 and 43. Electrically-insulating, thermally-conductive materials 32 electrically insulate electrodes 42 and 43 from the conductive materials 27 and 36 of the high and low temperature heat pipes 22 and 23 respectively. The interelectrode spaces 44 are filled with a gas having a very low ionization potential, preferably cesium vapor.

Specifically, cesium vapor has a very low ionization potential (3.87 volts). Other suitable gases would be vapors of Rubidium, Barium and Potassium, all of which have ionization potentials below 5.00 volts. The pressure of the cesium vapor should be high enough so that the conversion units operate in the "ignited mode." (between 5 and 30 Torr.)

Each thermionic conversion unit 41 is insulated from the remaining conversion units by annular discs 46 composed of electrically and thermally insulative materials. Each disc 46 has an annular groove 47 cut into its upper surface. The groove functions as reservoir for collecting liquid cesium in the thermionic conversion units, thus preventing an electrical short between the electrodes 42 and 43.

As depicted in FIG. 8, five thermionic conversion units 41 are electrically connected in series. Specifically, the emitter electrode 42 of the first thermionic unit 41 is electrically connected to the high temperature heat pipe 23 (schematically shown by line 48), and the collector electrode 43 of the last thermionic unit 41 is electrically connected to the low temperature heat pipe 22 (schematically shown by line 49). The series electrical connection between the collectors 43 and the emitters 42 of the remaining thermionic units 41 in the series are schematically indicated by the lines 51. Accordingly, the electrical output of the thermionic convertor 41 are cascaded and then electrically connected in parallel between the high and low temperature heat pipes 23 and 22.

More particularly, the high temperature heat pipe also functions as an electrical conductor and supplies the ground or reference potential. The low temperature heat pipe 22 also acts as a conductor for conveying electrical current generated by the thermionic units 41 to the central conductive rod 16 connected to the generator 19 on the ground surface 17. Electron flow through the generator 19 is schematically by the arrows 52.

The electrodes 42 and 43 are both composed of one of the common refractory metals such as tantalum, tungsten, molybdenum and rhenium. Also, the high and low temperature heat pipes 23 and 22 should be composed of such common refractory materials which have structural integrity at temperatures above 1500° C. Suitable high temperature materials 32 for the insulative discs 46 include the ceramics zirconia ($ZrO_2$) and fosterite ($2MgO.SiO_2$). Suitable materials 33 for insulating the respective electrodes 42 and 43 from the heat pipes 22 and 23 include the ceramics alumina ($Al_2O_3$), berryllia (BeO) and boron nitride (BN).

Thermoelectric Generator System

Figure 10:
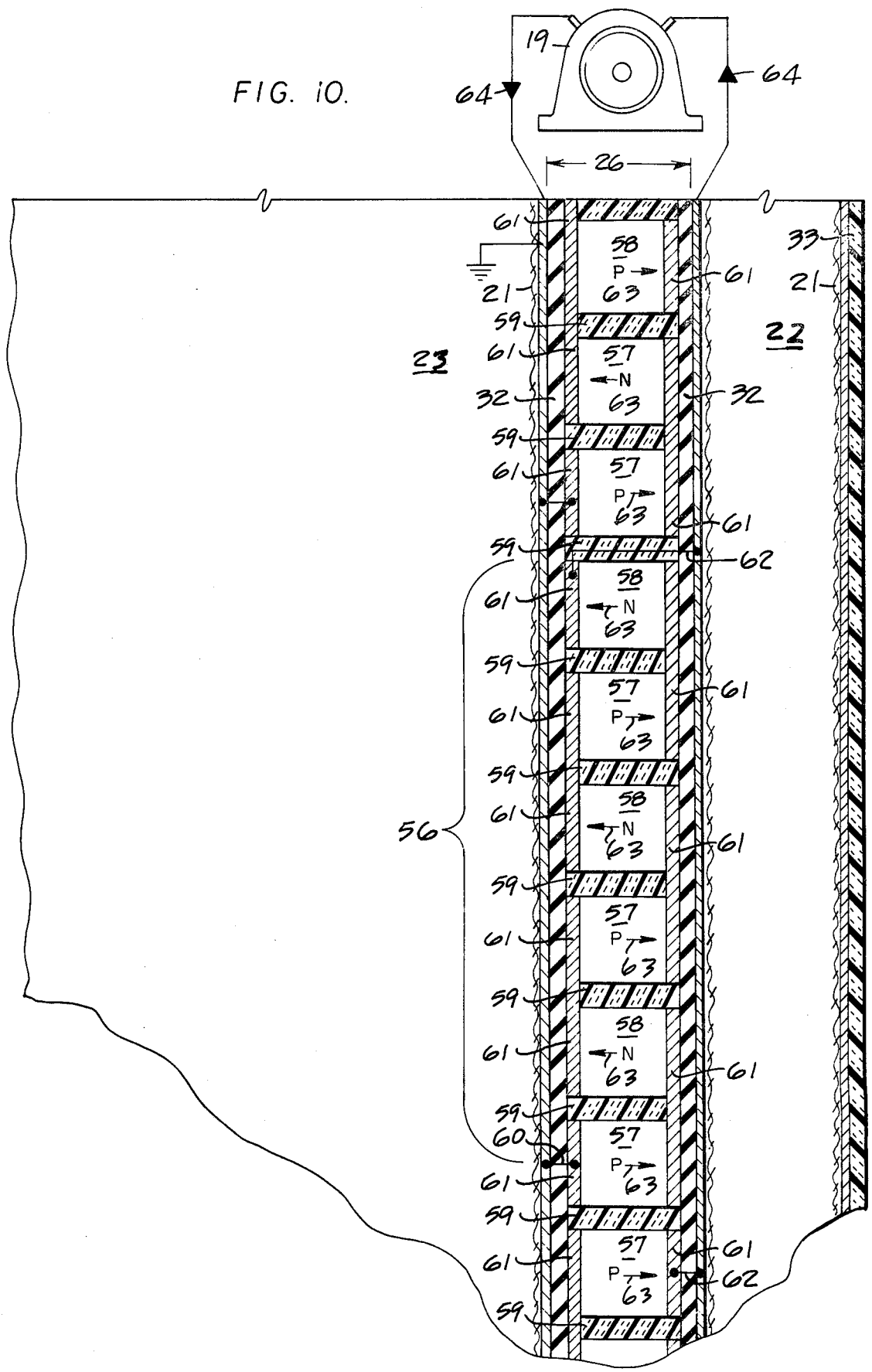
FIG. 10 is a vertical cross-sectional view of an exemplary thermoelectric generator unit disposed in the annulus between the high and low temperature heat pipes.

FIG. 10 shows an exemplary configuration for a thermoelectric generator unit disposed in the annulus 26 between the high and low temperature heat pipes 23 and 22. As depicted, each thermoelectric generating unit 56 includes a cascaded convertor formed of alternate rings of P-Type materials 57 and N-type materials 58, separated by thermal and electrical insulator rings 59, and annular conductive contacts 61 electrically connecting the P-type and N-type rings in the series. The thermoelectric generator units 56 are sandwiched between an electrically insulating thermally conductive material 32, such that the respective contacts 61 are electrically insulated from, yet thermally coupled to, the high and low temperature heat pipes 23 and 22 respectively.

The electrical connection between each thermoelectric generator unit 56 and the high temperature heat pipe 23 is shown schematically as the line 60. Similarly, the line 62 schematically indicated the electrical connection between the thermoelectric generator unit 56 and the low temperature heat pipes. The directions of current flow through the respective rings of P-type and N-type materials 57 and 58 are indicated by the arrows 63. A current loop through the D/C-to-A/C generator 19 is shown schematically by the arrows 64.

In the thermoelectric generator system the heat pipes 22 and 23 may be composed of materials other than the common refractory materials, depending upon the temperature dominions of the geological strata in which they must maintain structural integrity. Suitable electrically insulating thermally conductive materials 32 for electrically insulating the generating units 56 from the heat pipes 22 and 23 includes the ceramic alumina ($Al_2O_3$), berryllia (BeO) and boron nitride (BN). The annular contacts 61 may be composed of different materials depending upon the particular combination of P-type and N-type materials 57 and 58 chosen.

Suitable P and N-type materials depend upon the temperature dominion in which they must function. For example, in a temperature dominion between 600° C. and 1000° C. the various silicide materials would be suitable. Also the various lead telluride materials may be acceptable. (For a discussion of high temperature thermoelectric silicide materials, see an article by S.E. Mayer and I.M. Ritchie titled "The Use of High-Temperature Thermal-Electric Materials (Silicides) for Power Generation in Space" published in a compilation entitled *Space Power Systems* edited by N.W. Snyder and published by Academic Press, New York, 1961.

Insulation

This discussion will be mostly concerned with materials actually and successfully used. These materials must be selected with care since they must have other properties besides the desired thermal or electrical insulation. These include fabricability in thin layers, dielectric strength, interface contact, thermal and electrical resistances, and, very importantly, a compatible thermal coefficient of expansion with the contacting materials.

Another important problem is chemical compatibility with contacting materials at high temperature as will be discussed.

1. Electrically insulating, thermally conducting. Increasingly, in all applications calling for electrically insulating and thermally conducting material, alumina ($Al_2O_3$) is becoming the ceramic of choice. It is used in high and low temperature applications, in thermionic and thermoelectric generators. It is often applied in a plasma sprayed layer. It is sometimes cast between molybdenum cylinders at 2200° C. (Which may degrade it). Used this way at high temperatures, with a 5 mill thickness, it has an electrical insulation of several thousand ohms, with a thermal drop of 20° C.

The properties of alumina as a thermal conductor and electrical insulator are even more enhanced at lower temperatures.

Other materials suggested for use as electrically insulating, thermally conducting insulation for thermionic generators are berryllia (BeO) and boron nitride (BN). (See Hirsch, R. L. and Holland, J. W., "Problems Associated with the Development of a Thermionic Conversion Reactor," *Progress in Astronautics and Rocketry Vol. 4 —Space Power Systems*. Snyder, NW ed. Academic Press, New York, 1960 page 394).

Alternatives are needed at high temperatures (> 1000° C) to solve the problem of chemical compatability with adjacent materials. For instance, at 1350° C, alumina and molybdenum change to aluminum and molybdenum-oxide in 100 hours. Tantalum also reacts with aluminum. On the other hand, niobium and tungsten go very well with alumina due to their good thermal expansion match and resistance to cesium attacks.

Thus, particularly at high temperatures, it is not just a problem of selecting a ceramic insulator, but of selecting good metal-ceramic combinations. This will also be a consideration in the selection of thermal insulators. The problem is investigated in an article by Peter Rouklove, "Metallurgical Study of Thermionic Convertors," *IEEE Transactions on Electron Devices, August* 1969, pages 672–678.

Berryllia is used as the cold junction electrical insulation in thermoelectric generators for space craft. Probably one reason for this is its compatibility with the berryllium radiators, but it is interesting to note the thermal conductivity of berryllia at low temperatures.

2. Thermally and electrically insulating materials.

The ceramics that will be discussed for this purpose are thoria ($ThO_2$), zirconia ($ZrO_2$), and foserite (Magnesium orthosilicate-$2MgO.SiO_2$).

At high temperatures (> 1000° C) and prudently, at intermediate temperatures (600° C to 1000° C) or less, careful consideration must be given to the combination of ceramic and metal used, from the viewpoint of their chemical reactivity. Zirconia and thoria react with tantalum and molybdenum at temperatures above 1300° C. Fosterite-molybdenum is a successful combination, and ceramic bodies at least reactive with tungsten.

The ceramics listed are useful for their good thermal expansion match to refractory metals, which is particularly important in ceramic-metal seals, and where a metal-ceramic bond must have integrity under thermal stress.

The thermal conductivity of zirconia, unlike the other ceramics examined, decreases as the temperature decreases. This makes if useful for all temperature ranges. Fosterite is useful at temperatures over 600° C. Thoria is only useful as a thermal insulator at very high temperatures (> 1000° C).

3. Electrically and thermally insulative disks separating the thermionic diodes in series.

This is the same problem just discussed, and subject to the same criteria of ceramic-metal combinations, and zirconia, fosterite, or thoria may be used. However, there is an important proviso here. What constitutes insulation is relative to the situation. To avoid excessive thermal losses across the ceramics, the separative disks must constitute only a small proportion of the area of the heat pipes used by the diodes. For instance, if the thickness of the disks (their cylindrical lengths) is $5 \times 10^{-3}$ times the length of the diode annulus, the heat leakage through them will be only about 2 ½ percent of the input. Where 2 in. long diodes are used, the disks should be only 0.01 in. thick. There is no problem with their electrical insulating capacity.

4. Electrically and thermally insulative disks separating the thermoelectric elements.

This is more complicated problem, which depends upon the thermoelectric material selected, i.e., the separators must be non-reactive with the thermoelectric materials.

But there is another question to consider here, and that is the degree of compression of the thermoelectric materials. Specifically, it is sometimes desirable to have compression in the source to sink direction to lower resistance at the interface with the series connectors. A compressive stress may be inherently provided in the described systems in that the interior heat pipes would normally expand more than the exterior heat pipe. Hence it must be decided whether rigid separating disks should be used to maintain the structural integrity of the annulus or whether less firm separating disks should be used allowing for expected thermal expansion.

A suitable rigid material is zirconia, since its thermal conductivity is about one-third that of the silicides; its heat leakage will be one-third of the percentage of the length of pipe occupied. Thus, if it occupies 9percent of the pipe, there will be 3percent loss of input heat, and this provides sufficient leeway. Its electrical leakage is not significant.

On the other hand, if a looser packing is desired, high temperature powder or fibrous insulations such as Min-K®, Dyna-Quartz® and Micro-Quartz® are suitable for separating the rings of thermoelectric materials. Min-K has a very low thermal conductivity of 0.04 BTU/hr ft ° F compared to 1 BTU/hr ft ° F for zirconia.

If structural support between inner and outer pipes is desired, a ceramic disk could be used at occasional intervals, sandwiched on either side by one of the looser materials.

Another recommended material is potassium titanate. It has been tested as a separator of lead telluride material sandwiched between a source and a sink. It is recommended for annular configurations, for use with other materials, and for heat sources to 1200° K. (it was utilized at a heat source of 866° K). (See Kerr, Douglas L., "Thermoelectric Elements in Space Power Systems —Energy Conversion for Space Powder Systems" (Progress in Astronautics and Rocketry, Vol. 3), Snyder, N. W. ed. Academic Press, New York, 1961).

A PRELIMINARY ANALYSIS OF A THERMIONIC OPERATOR SYSTEM

The equations which govern the voltage and current output in a thermionic diode are:

$$V = \phi_e - \phi_c - V_d$$

$$T_{c_{max}} ; 32 \ (\phi_c/\phi_e) T_e$$

$$J_{sat} = A_1 T_e^2 \exp(-11{,}606 \ \phi_e/T_e)$$

$$J = rJ_{sat}$$

where:

- $T_e =$ emitter temperature, determined in this application by the temperature at the periphery of a magmatic crustal intrusion
  = 1200° C = 1473° K
- $T_c =$ collector temperature, determined by the above equation such that it is the maximum permissible temperature that will not significantly reduce output by causing back emissions.
- $\phi_e =$ emitter neutralization work function, i.e., the electromotive force necessary to move electrons across the interface of the hot junction of the thermocouple whose p-type material is the positive ion plasma, and whose n-type material is the emitter.
- $\phi_c =$ collector interface work function
- $w =$ electrode spacing, used here at its optimum value of 2 mills
- $P_{es} =$ pressure of the plasma vapor, here to be 5 torr
- $P_{es}w =$ interelectrode pressure-spacing product = 10 mill-torr
- $V_d =$ voltage drop internally in an ignited mode convertor, determined from graphs of experimental results as a function of $P_{es}w$.
- $V =$ voltage output of the diode
- $J =$ diode output current density of flux
- $J_{sat} =$ saturation current density
- $r =$ fraction of saturation current that will flow, determination from graphs of experimental results as a function of $V_d$
- $A_1 =$ emission constant, which has a theoretical value = 120 amp cm$^{-2}$° $K^{-2}$ but is determined experimentally larger as a material property.

A derivation of these equations may be found in *Direct Energy Conversion, Second Edition*, Angrist, Stanley W., Allyn and Bacon, Inc., Boston 1967. Chapter 6.

1. Additives may be used with the interelectrode vapor.
2. Additives may be coated on the electode surface. For example, thorium added to a tungsten electrode increases the emission rate by a factor of several orders of magnitude. A monomolecular layer of cesium on tungsten will produce an even greater effect. Cathodes coated with oxides of barium, calcium and strontium have high emission rates and mixed oxide coatings are used in vacuum tubes. (See Plenum *Handbook of High Temperature Materials, No. 2. Properties Index*, G. V. Samsonov, 1969)

The use of additives to electrodes of thermionic diodes may be seen as analagous to the use of dopents to increase the output potential of semi-conductors used for thermoelectric generators.

If the values for neutralization work functions are:

$$\phi_e = 1.78v$$

$$\phi_c = 1.00v$$

then:

$$T_c = 556° \ C$$

The voltage drop across the diode ($V_d$) is estimated from the literature to be approximately 0.48v for a space pressure product (Pw) of 10 mill-torr.

Thus:

$$V = 0.30v \text{ and } J_{sat} = 212 \ amp/cm^2$$

Referring to Graph I below showing the ratio of the actual current density to the saturation current density as a function of a corrected voltage (the load voltage less the difference in electrode work functions), we determine the fraction of saturation current that will flow (r) to be (0.50) where $V_d = 0.48v$ with a space pressure product of 10 mill-torr.

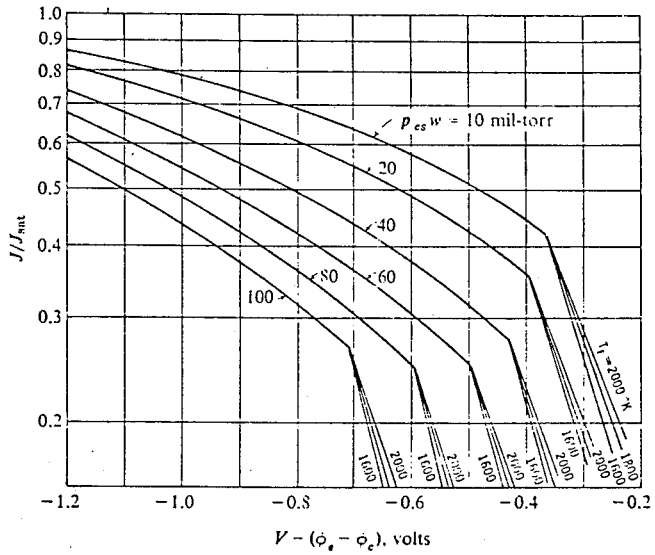

GRAPH I

From the equation for $J_{sat}$, known as the Richardson-Dushman equation, it may be seen that the current increases exponentially as $\phi_3$ decreases. To have a small $\phi_e$, it is necessary to have an even smaller $\phi_c$. There are two important things that can be done to achieve this.

Then the diode output current density $J = 106$ amp/cm$^2$.

The power density is then:

$$P = JV = 31.8 \ watts/cm^2$$

If we used 3 inch diameter heat pipes covered by 2 inch long electrodes, the emitter area of each electrode is $$A = \pi dh = 122 \text{ cm}^2$$

Then the power output, and load resistance for each diode optimum output are:

$$P_o = PA = 3.89 \times 10^3 \text{ watts}$$

$$I = JA = 1.30 \times 10^4 \text{ amps}$$

from $$P_o = V^2/R_o$$

$$R_o = V^2/P_o = 2.31 \times 10^{-5} \text{ ohms per diode}$$

In this analysis we have made no distinction between planar or annular configuration, since with a 3 inch diameter cylindrical electrode, and an interelectrode spacing of 0.002 in., the difference is negligible.

We now determine the various forms of heat energy leaving the emitter in order to calculate the total heat energy input to the convertor.

The heat conducted by the cesium, using a thermal conductivity of $k = 1.24 \times 10^{-4}$ watt cm$^{-1}$ k$^{-1}$, is:

$$Q_{cd} = (k\Delta T)/w = 15.7 \text{ watts/cm}^2$$

The energy emitted by radiation, using the Stefan-Boltzman law of radiation, for shape factor of unity, on grey surfaces, is given by the equation:

$$Q_{ra} = 5.62 \times 10^{-12} (T_e^4 - T_c^4) (\epsilon_e^{-1} + \epsilon_c^{-1} - 1)^{-1} \text{ watts/cm}^2$$

Where the emissivity ($\epsilon_e$) of the emitter at $T_e$ is $\epsilon_e = 0.145$, and the emissivity ($\epsilon_c$) of the collector at $\sqrt{T_e T_c}$ to compensate for the electrodes not being true grey bodies is $\epsilon_c = 0.108$, then:

$$Q_{ra} = 1.54 \text{ watts/cm}^2.$$

The thermal energy carried from the emitter by the stream of electrons having sufficient energy to overcome the interface potential barrier is determined from the equation:

$$Q_e = J_e \phi_e + J_e (2k^1 T_e)$$

where
$k^1$ = Boltzman's constant
then:

$$Q_e = 215 \text{ watts/cm}^2.$$

There is also thermal leakage through the lead wires, connecting the diodes in series ($Q^1_{cd}$). There is an optimum size of lead wire which will be the best compromise between minimizing the thermal conductance and maximizing the electrical conductance. Equations for calculating this are developed in terms of the thermal efficiency ($N_t$) which we estimate and calculate the resulting lead wire dimensions and its thermal leakage. If the calculated efficiency thus resulting differs from the estimate, the process is reiterated until they agree. Thus:

$$Q_s = Q_{cd} + Q_{ra} + Q_e + Q_{cd}^1$$

$$N_t = \frac{P}{Q_s} = \frac{P}{Q_{cd} + Q_{ra} + Q_e + Q_{cd}^1} \approx 11\%$$

The equations for optimum voltage and heat flux through the lead wire are:

$$V_1 = \left[ \frac{L_w T_{av}(T_e - T_c) N_t}{1 - \frac{1}{2} N_t} \right]^{\frac{1}{2}} \quad (1)$$

where $L_w$ is the Wiedman-Franz-Lorenz constant ($2.45 \times 10^{-8}$ watt-ohm/° K$^2$)

$$Q'_{cd} = J_e V_1 (1 - N_t)/N_t \quad (2)$$

Since the lead wire connects the diodes in series, we use the temperatures of emitter and collector for is temperatures at either end and we calculate:

$$V_1 = 6.50 \times 10^{-2} \text{ volts}$$

$$Q'_{cd} = 55.7 \text{ watts/cm}^2$$

The total heat input per diode is then:

$$Q_s = Q_{cd} + Q_{ra} + Q_e + Q'_{cd} = 288 \text{ watts/cm}^2$$

The thermal efficiency is:

$$N_t = P/Q_s = 11\%$$

which agrees with the estimated value.

We calculate the dimensions of the lead wire from $V = IR$ and $$V_1 = I_e \frac{\rho_e 1 \, e_1}{A_1}.$$

Assume a metal whose resitivity is $\rho_1 = 5 \times 10^{-5}$ ohm-cm, and $l_1$ is fixed by the design $= 0.5$ cm. then:

$$A_1 = \frac{I_e \rho_1 l_1}{V_1} = 5 \text{cm}^2$$

If the wire is composed of metal foil around the annulus with one edge on the emitter, and the other on the collector of the next diode in series, its average circumference is $\pi d = (3.14)(3 \text{ in.})(2.54 \text{ cm/in.}) = 289$ cm., which means the thickness of the foil should be 5 cm$^2$/289 cm = $1.73 \times 10^{-2}$ cm.

We now estimate the energy resupply rate available from the magma to replace the energy extracted by placing a sink in the field.

The heat intake cylinder is small compared to the field, and appears as a point sink. for a sphere buried a distance z below an isothermal surface $$q = \frac{4 \pi r}{1 - r/2z} k (T_h - T_c).$$

If we are in a large magma reservoir dome, a very great distance above an estimated 8000° C isothermal subcrustal source, Z is very large and $r/2z \rightarrow 0$, so $$q = 4\pi r k (T_h - T_c)$$

We will take the thermal conductivity of the magma as that of the earth's interior $= 0.2$ cal-sec$^{-1}$cm$^{-1}$C$^{-1} = 0.836$ watts cm$^{-1}$K$^{-1}$, calculated from its electrical resistivity. This may be a low figure if the core is mostly solid beneath the magma. It may be a high figure if the core has a large metallic component or is a compressed mass of undifferentiated material. The thermal conductivity of congealing lava, based on a diffusivity of 0.0118 cm$^2$sec$^{-1}$, a density of 3.3g/cm$^3$, and a specific heat of 0.24 cal gm$^{-1}$c$^{-1}$ is (0.0118) (3.3) (.24) = 0.0094 cal sec$^{-1}$cm$^{-1}$C$^{-1}$ = 0.039 watt cm K. This is only a little higher than the average upper crustal conductivity of 0.0254 watt cm$^{-1}$K$^{-1}$. The value chosen seems more reasonable, since the congealing lava has a high proportion of crystallized material, and the magma reservoir must be more fluid since it must be heated by convection to exist. However, it may be off by an order of magnitude in either direction.

We take the area of our point sink sphere as equal to the surface area of the heat intake section. Since we are using conduction, we use the circumference of the well casing instead of the total of the heat pipes, which may be overly conservative.

Equating the surface area of our point sink sphere to the heat intake cylinder:

$$A_s = 4\pi r_s^2 \quad A_c = 2\pi r_c L_c$$
$$4\pi r_s^2 = 2\pi r_c L_c$$
$$r_s = \sqrt{\tfrac{1}{2} r_c L_c}$$

Assuming a 100 ft. intake section is the longest practical, and a well diameter of 1 foot, then:

$$Q_t = 4\pi r_s K(T_h - T_c) = 4\sqrt{\tfrac{1}{2} r_c L_c} k(T_h - T_c) = 1.08 \times 10^7 \text{ watts}$$

The power output is then:

$$P_t = N_t Q_t = 1.19 \times 10^6 \text{ watts} = 1.19 \text{ megawatts}$$

The size of the diodes can be changed as desired; it will not affect the power output. The cesium reservoir is a critical factor. For instance, if the emitter temperature were 1800° C and the collector temperature from 600° C to 900° C, it is important for the cesium reservoir to be about 400° C. Power output is very sensitive to changes of 50° C from this setting, although it is better to be slightly on the higher side.

The calculated efficiency is the result of designing for the least feasible low temperature for thermionic diodes (1200° C). Since the output is an exponential function of the temperature, if a slightly higher temperature is encountered, the efficiency, and thus the power generated, would greatly increase.

It should be noted that we have considered the potential energy of the field that can be transported to the point sink, via the resistance of the shape factor, if the energy were at its equivalent flow rate. There remains to be considered the rate at which the energy can be accelerated to its extraction rate. This is important because if we suddenly place a sink in the field which extracts energy at a rate determined by the temperature differential across th convertors, the magma around the sink would freeze and insulate it.

The generator must slowly and carefully be brought up to its full potential, at a rate which can be determined by the usual methods for non-steady-state situations. This means that the device must initially be allowed to heat up to the media temperature, and then the collector temperature slowly lowered by lowering the temperatures of the cooling or low temperature heat pipes.

Once steady state is reached, local conditions no longer prevail, and the potential available is that of the entire field.

A PRELIMINARY ANALYSIS FOR A THERMOELECTRIC GENERATOR SYSTEM

The voltage (V) generated by a thermoelectric generator is determined from the average Seebeck coefficient, $S$, over the temperature range $T_h \rightarrow T_c$ per the relationship:

$$V = \overline{S}(T_h - T_c) = \overline{S}\Delta T$$

where
$T_h$ = heat source temp.
$T_c$ = heat sink temp.

The voltage output is given by the equation:

$$V_L = V - IR_c$$

where $R_c$ is the internal resistance and $R_L$ is the load resistance.

The internal electrical resistance and internal thermal conductance are determined by the geometry of the thermal elements and their material properties of resistivity and conductivity.

For this application, the thermoelements are formed into an annulus between two concentric cylinders.

The heat that flows out of the annulus is:

$$q = -k A (dT/dr)$$

where
$k$ = thermal conductivity
$A$ = area of flux
$L$ = length of cylinders
since $A = 2\pi r L$ $$q \int_{r_i}^{r_o} \frac{dr}{r} = -2\pi k L \int_{T_i}^{T_o} dT$$

where
$r_o, r_i$ = radii of outer & inner cylinders
$T_o, T_i$ = temperature at outer & inner cylinders $$q = \frac{2\pi k L}{\ln(r_o/r_i)} (T_i - T_o)$$

Which means the thermal conductance is:

$$K = \frac{2\pi L}{\ln(r_o/r)} k$$

Similarly, the electrical resistance is:

$$R = \frac{\ln\left(\frac{r_o}{r_i}\right)}{2\pi L} \rho$$

where
$\rho$ = electrical resistivity

For the $n$ and $p$ elements of the couple, the internal conductance and resistance is:

$$K_c = \left(\frac{2\pi L k}{\ln(r_0/r_i)}\right)_p + \left(\frac{2\pi L k}{\ln(r_0/r_i)}\right)_n \text{ where } (x)_p = x_p$$

$$R_c = \left(\frac{\rho \ln(r_0/r_i)}{2\pi L}\right)_p + \left(\frac{\rho \ln(r_0/r_i)}{2\pi L}\right)_n$$

Because the severest limitation of the system is the available input heat flow, we optimize the thermal efficiency rather than the power density.

We first total the heat input through the heat source. The heat conducted to the sink is:

$$Q_k = K_c(T_h - T_c) = K_c \Delta T$$

Additional heating comes from running current through the generator, reversing the generator effect to produce heat, determined by the Peltier coefficient, $\pi$, as $$Q_p = \pi I$$

The Kelvin relation gives the relationship between the Seebeck and Peltier effects as:

$$S = \pi/T$$

Using again the average $S$ in the temperature range $T_n \to T_c$, $$Q_p = \pi I$$

$$Q_p = \overline{S} T_h I$$

Finally, it is assumed that half the Joule heating (which is frictional and not intake energy) reaches the heat source, the other half going to the sink.

$$Q_j = I^2 R_c$$

The total heat imput is then $$Q_A = Q_K + Q_P - \tfrac{1}{2} Q_j = K_c \Delta T + \overline{S} T_h I - \tfrac{1}{2} I^2 R_c$$

The power output is:

$$P = I^2 R_L$$

or $$P = I V_L = I(V - IR_c) = I \overline{S} \Delta T - I^2 R_c$$

The thermal efficiency is then:

$$N = \frac{P}{Q_A} = \frac{M}{(1+M) + \frac{K_c R_c}{S^2} \frac{(1+M)^2}{T_h} - \frac{\Delta T}{2T_h}} \cdot \frac{\Delta T}{T_h}$$

where
$M$ = resistance ratio = $R_L/R_c$ and using $$I = \frac{\overline{S} \Delta T}{R_c + R_L}$$

Also, a figure of merit, $Z$, is defined with the dimensions °K$^{-1}$:

$$Z = S^2/(K_c R_c)$$

A similar quantity, $z = \overline{S}^2/k\rho$ is used to evaluate the material properties of thermoelectric materials, considering the best compromises between resistivity, conductivity and Seebeck coefficient.

It may be seen that for a single material, either n-type or p-type, $Z = z$, and high $z$ = high $Z \to$ high $N$.

For the thermocouple of two materials, we begin to maximize N by holding M constant and maximizing Z, which is to say we minimize $K_c R_c$. This will determine the geometry of the thermoelements which yields the best compromise between thermal conductance and electrical resitance to yield the greatest thermal efficiency. Low resistance produces more power output, and low conductance consumes less heat imput, but changing the size of the element increases one and decreases the other.

For the annulus using the derivation above, $$K_c R_c = \left[\left(\frac{2\pi L k}{\ln\left(\frac{r_0}{r_i}\right)}\right)_p + \left(\frac{2\pi L k}{\ln\left(\frac{r_0}{r_i}\right)}\right)_n\right]\left[\left(\frac{\rho \ln\left(\frac{r_0}{r_i}\right)}{2\pi L}\right)_p + \left(\frac{\rho \ln\left(\frac{r_0}{r_i}\right)}{2\pi L}\right)_n\right]$$

We define a ratio of shape factors, $$g = \frac{\left(\frac{\ln\left(\frac{r_0}{r_i}\right)}{2\pi L}\right)_n}{\left(\frac{\ln\left(\frac{r_0}{r_i}\right)}{2\pi L}\right)_p}$$

$$K_c R_c = (k\rho)_p + (k\rho)_n + g k_p \rho_n + \frac{1}{g} k_n \rho_p$$

Then, minimizing $K_c R_c$ with respect to $g$, from which $$g_{opt} = \left[\frac{k_n \rho_p}{k_p \rho_n}\right]^{\frac{1}{2}}$$

and $(K_c R_c)_{opt.} = [\sqrt{(k\rho)_p} + \sqrt{(k\rho)_n}]^2$ we get the relationship:

$$N = \frac{M}{(1+M) + \frac{1}{Z_{opt}} \frac{(1+M)^2}{T_h} - \frac{\Delta T}{2T_h}} \cdot \frac{\Delta T}{T_h}$$

where $Z_{opt} = \dfrac{\bar{S}^2}{(K_c R_c)_{opt}} = \dfrac{\bar{S}^2}{[\sqrt{(k\rho)_p} + \sqrt{(k\rho)_n}]^2}$ Now optimizing the efficiency with respect to $M = (R_L/R_c)$, we obtain the relationships:

$$M_{opt} = \sqrt{1 + Z_{opt}T_{av}} \text{ where } T_{av} = \dfrac{T_1 + T_2}{2}$$

$$\text{and } N_{max} = \dfrac{M_{opt} - 1}{M_{opt} + \dfrac{T_c}{T_h}} \cdot \dfrac{\Delta T}{T_h}$$

Since $\Delta T/T_h = N_c$, the carnot efficiency, or maximum possible at $T_h$, the material efficiency $\epsilon$ or achieved fraction of the possible is:

$$\Sigma = \dfrac{M_{opt} - 1}{M_{opt} + \dfrac{T_c}{T_h}} = \dfrac{\sqrt{1 + Z_{opt}T_{av}} - 1}{\sqrt{1 + Z_{opt}T_{av}} + \dfrac{T_c}{T_h}}$$

We now summarize the equations derived for maximum thermal efficiency for the annulus, with optimized geometry and resistance ratio. We also add current, voltage and power obtained from these. These are all expressed in terms of properties of the thermoelectric materials, $k$, $\rho$, and $s$, and for the p and n materials.

sink. Thus each material would operate in the temperature range for which it is more efficient. This would mean applying two or more successive layers of thermoelectric materials to the heat source pipe. However, for this example, we shall say that the p and n segments are each composed of a single annulus of the same thickness. This immediately gives:

$$G_{opt} = \dfrac{L_p}{L_n} = \left(\dfrac{k_n \rho_p}{k_p \rho_n}\right)^{\frac{1}{2}} \text{ since } \left(\dfrac{r_o}{r_i}\right)_n = \left(\dfrac{r_o}{r_i}\right)_p$$

2. The inner radius of the annulus, $r_i$.

The inner radius of the annulus will be the outer radius of the heat source heat pipe plus the insulation plus the conductor. The radius of the heat pipe will depend upon how many pipes are used in the available well space of the well casing. But conversely, we might want to determine the diameter of the well shaft by including sufficient heat pipes to intake the available heat at the location used. Present technology heat pipes transport 10 kw in the horizontal position, but would have the assistance of the force of gravity to aid capillary action

| | |
|---|---|
| $N_{max} = \dfrac{M_{opt} - 1}{M_{opt} + \dfrac{T_c}{T_h}} \dfrac{\Delta T}{t_h}$ | gives the thermal efficiency (optimum) |
| $M_{opt} = \dfrac{R_L}{R_c} = \sqrt{1 + Z_{opt}T_{av}}$ | gives the resistance ratio (optimum) |
| $Z_{opt} = \dfrac{\bar{S}^2}{[\sqrt{(k\rho)_p} + \sqrt{(k\rho)_n}]}$ | gives the figure of merit (optimum) |
| $G_{opt} = \left[\dfrac{k_n \rho_p}{k_p \rho_n}\right]^{\frac{1}{2}}$ | gives the ratio of shape factors (optimum) for an annulus |
| $I_{opt} = \dfrac{\bar{S}\Delta T}{R_c(1 + M_{opt})}$ | gives the output current (optimum) per couple |
| $V_{L_{opt}} = \dfrac{\bar{S}\Delta T M_{opt}}{(1 + M_{opt})}$ | gives the output voltage (optimum) per couple |
| $P_{opt} = \dfrac{M_{opt}}{R_c}\left(\dfrac{\bar{S}\Delta T}{1 + M_{opt}}\right)^2$ | gives the output power (optimum) per couple |
| $R_c = \left(\dfrac{\rho \ln \dfrac{r_o}{r_i}}{2\pi L}\right)_p + \left(\dfrac{\rho \ln \dfrac{r_o}{r_i}}{2\pi L}\right)_n$ | gives the internal resistance |

(Note: $\bar{S} = S_n + S_p$)

There remain in the last equation six variables unspecified (other than material properties) which are: $(r_o, r_i, L)_p$ and $(r_o, r_i, L)_n$. There is, however, one relationship between them: $G_{opt}$. This leaves five degrees of freedom, to be specified by engineering considerations.

1. The thickness of the annulus of n-type material as compared to the thickness of the annulus of p-type material.

For ease of manufacture, both annuli may have the same thickness, although this need not be so. It should be noted that, for a large temperature difference between $T_h$ and $T_c$, it is more efficient to cascade thermoelectric materials between the heat source and the heat in the vertical position. Another consideration is that increasing the number of heat pipes increases the surface area available for both the heat emitted through the convertors and the heat intake, thus reducing the size of the generator assemble required. These considerations will determine $r_i$.

3. The thickness of the thermoelectric annuli, which determines $(r_o/r_i)$.

The limitation on the minimum thickness used will have to be chosen so as not to exceed the maximum permissible current flow density which will maintain the integrity of the thermoelectric materials used, although a larger thickness might be used. We use the inner radius to specify the area which, when multiplied by the maximum permissible current flow density gives the current:

$$I = J_{max}A \qquad A = 2\pi r_i L_s$$

where $L_s$ is the length of the cylindrical annulus of either the $n$ or $p$ material, whichever is less. We determine which is less, under the present assumption of equal thickness, from $$G_{opt} = L_p/L_n,$$

and $L_s$ is either $L_p$ or $L_n$.

Thus $$I = J_{max}(2\pi r_i L_s)$$

By combining this equation with the relations developed above for $I_{opt}$, $R_c$, and G, it is possible, after specifying $r_i$, to solve for $r_o$. This completely specifies the variables in the derived equations but it is easier to make this last combination of equations after we know whether $L_s$ is $L_n$ or $L_p$.

4. The proper resistance, voltage and current to run the D.C. to A.C. generators.

This last criteria carries with it an additional degree of freedom; more than one well may be used per D.C. to A.C. converter, more than one D.C. to A.C. convertor may be used per well. If this does not permit sufficient flexibility to meet the requirements of the D.C. to A.C. convertors, these requirements will have to be considered in the selection of the previous three variables.

We consider a series-parallel array of $N_b$ braches with $N_c$ number of couples in each branch, and a total number of thermocouples $N_t = N_b N_c$.

The proportion of the total resistance seen by each generator, obtained by the formation of an equivalent circuit, may be seen to be $$R_{each} = (N_b/N_c)R_t$$

We match this proportion to the load resistance determined by the thermal optimization, so that the proportion of the total resistance seen by each thermocouple will be the specified load resistance.

from $M_{opt} = R_l/R_c \qquad R_l = M_{opt}R_c$ so $M_{opt}R_c = (N_b/N_c)R_t$ hence: $R_t = (N_c/N_b) M_{opt} R_c$ For maximum power transfer, the D.C. to A.C. converter should have the same imput impedance. Thus, with the previously determined $N_t = N_b N_c$, the number of branches and number of couples per branch are specified. If this does not produce satisfactory input resistance, voltage, and current for the operations of the D.C. to A.C. convertors, alterations in the design will have to be made.

Also, it should be noted that other and multidimensional types of arrays may be used, and redundency, to guard against large losses from individual failures, may be introduced.

We now determine the average material properties, over the temperature range of operation, for the thermoelectric materials used. For modified silicides, as we suggested in the graphs II–VII below, we have (assuming $p$ for modified silicides varies from the tested silicide in the same proportion as does $k$):

| for $T_h$ | = 1000 °C | $T_c$ = 100 °C |
| | = 1273 °K | = 373 °K |
| | P-Type | N-Type |
| $S_{av}$ | $200 \times 10^{-6}$ vK$^{-1}$ | $125 \times 10^{-6}$ vK$^{-1}$ |
| $\rho_{av}$ | $.5 \times 10^{-3}$ ohm cm | $.1 \times 10^{-3}$ ohm cm |
| $K_{av}$ | .04 watt cm$^{-1}$K$^{-1}$ | .065 watt cm$^{-1}$K$^{-1}$ |

GRAPH II

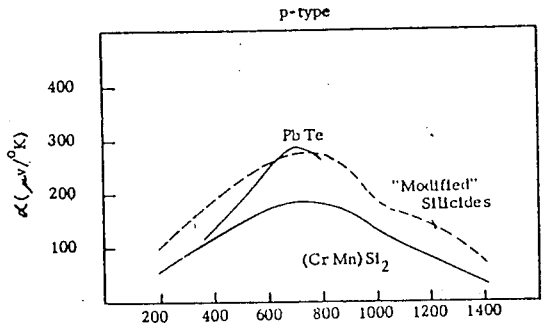

GRAPH III

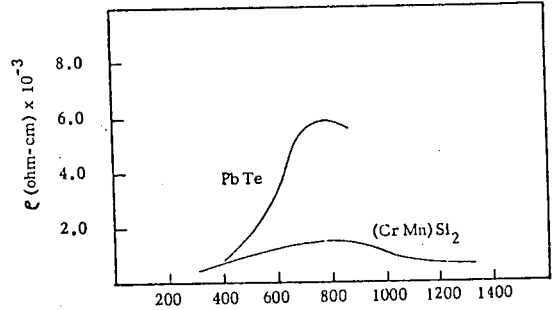

GRAPH IV
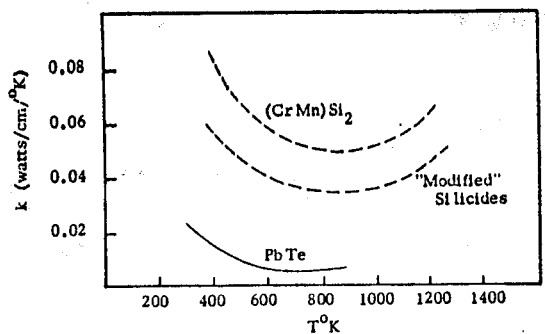
GRAPH V
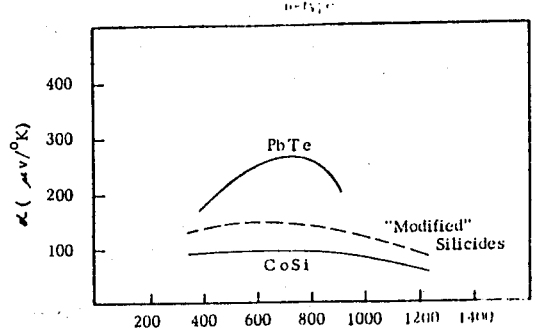
GRAPH VI
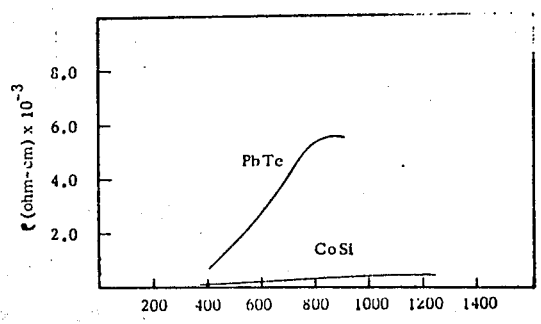
GRAPH VII
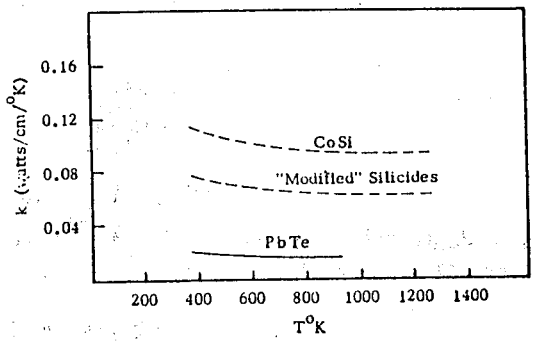
GRAPHS II-VII were taken from the article: Mayer, S. E. And Ritchie, I. M., "The Use of High Temperature Materials (Silicides) For Power Generation in Space," *Energy for Space Power (Progress in Astronautics and Rocketry,* Vol. 3). Snyder, Nathan W. ed., Academic Press, New York, 1961, pp. 63-72.

Using this data, we compute the following quantities:

1) $S = 325 \times 10^{-6} vk^{-1}$

2) $Z_{opt} = \dfrac{S^2}{\left[\sqrt{(k\rho)_p} + \sqrt{(k\rho)_n}\right]^2} = 2.15 \times 10^{-3} °K^{-1}$;

3) $M_{opt} = \sqrt{1 + Z_{opt} T_{av}} = 1.66$

4) $N_c = \dfrac{\Delta T}{T_h} = .706$ (carnot efficiency = 70.6%)

5) $\Sigma = \dfrac{M_{opt} - 1}{M_{opt} + \dfrac{T_c}{T_h}} = .338$ (material efficiency = 33.8%);

6) $N_t = \Sigma N_c = .237$ (thermal efficiency = 23.7%)

7) $V_{1_{opt}} = \dfrac{S(\Delta T) M_{opt}}{(1 + M_{opt})} = .183$ volts

8) $G_{opt} = \left[\dfrac{k_n \rho_p}{k_p \rho_n}\right]^{\frac{1}{2}} = 2.85$; and 9) $\dfrac{L_p}{L_n} = 2.85$ To determine $r_i$, we take one inch heat source reflux tubes, whose outer diameter is 1.315 in. We add to this, radially,

| | |
|---|---|
| Pipe, outer radius | .656 in. |
| Electrical insulation (alumina) | .005 in. |
| Series conductors (refractory metal) | .005 in. |
| Thermoelectric annulus, inner radius | .666 in. | so $r_i = 1.69$ cm

Now, taking $L_s = L_n$, we substitute $L_p = G_{opt} L_n$ and the expression for $R_c$ in the equation $$I_{opt} = \dfrac{S \Delta T}{R_c(1 + M_{opt})}$$

We can then equate this to $I_{opt} = J_{max}(2 \pi r_i L_s)$ so that we may determine the minimum radius which will cause excessive current density.

$$R_c = \left(\dfrac{\rho \ln\left(\dfrac{r_o}{r_i}\right)}{2\pi L}\right)_p + \left(\dfrac{\rho \ln\left(\dfrac{r_o}{r_i}\right)}{2\pi L}\right)_n$$

$$= \left(\dfrac{\rho_p}{G_{opt}} + \rho_n\right) \dfrac{\ln\left(\dfrac{r_o}{r_i}\right)}{2\pi L_n}$$

equating:

$$J_{max}(2\pi r_i L_n) = \dfrac{S \Delta T}{\left(\dfrac{\rho_p}{G_{opt}} + \rho_n\right) \dfrac{\ln\left(\dfrac{r_o}{r_i}\right)}{2\pi L_n}(1 + M_{opt})}$$

and:

$$r_{omin} = r_i \exp\left[\dfrac{S \Delta T}{J_{max} r_i \left(\dfrac{\rho_p}{G_{opt}} + \rho_n\right)(1 + M_{opt})}\right]$$

Now we take the value of $J_{max} = 750$ amp cm$^{-2}$ then $r_o = 2.32$ cm.

and $w = (r_o - r_i) = 0.63$ cm.

We now chose a small, practical value of $L_n$ to have enough couples to add in series and distribute among the reflux tubes, $L_n = 0.25$ cm.
Then $L_p = G_{opt} L_n = 0.713$ cm and:

1) $R_c = \dfrac{\ln\left(\dfrac{r_o}{r_i}\right)}{2\pi} \left(\dfrac{\rho_p}{L_p} + \dfrac{\rho_n}{L_n}\right) = 5.54 \times 10^{-5}$ ohms;

2) $P_{opt} = \dfrac{M_{opt}}{R_c} \left(\dfrac{S \Delta T}{1 + M_{opt}}\right)^2 = 3.62 \times 10^2$ watts;

3) $I_{opt} = \dfrac{S \Delta T}{R_c(1 + M_{opt})} = 1.98 \times 10^3$ amps;

The input heat is then $Q_a = P_{opt}/N_t = 1.52 \times 10^3$ watts per thermocouple (intake)

The specifications of the individual thermocouples thus determined for the material characteristics used, are

| | |
|---|---|
| $r_i = 1.69$ cm | inner radius |
| $w = .63$ cm | thickness of annuli |
| $r_o = 2.32$ cm | outer radius |
| $L_p = .713$ cm | length of P-type annuli |
| $L_n = .250$ cm | length of N-type annuli |
| $V_{1_{opt}} = .183$ v | voltage output of couple |
| $I_{opt} = 1.98 \times 10^3$ amps | current output of couple |
| $P_{opt} = 362$ watts | power output of couple |
| $Q_a = 1.52 \times 10^3$ watts | input heat per couple |
| $N_t = 23.7\%$ | thermal efficiency |

A hot geothermal area is defined as having a heat flux greater than 0.1 cal sec$^{-1}$cm$^{-2}$. We can assume modern geothermal prospecting techniques have located the magmatic heater of the aquifer so that we can assume an available heat flux $Q_s = 1.0$ cal sec$^{-1}$cm$^{-2} = 4.19$ watt cm$^{-2}$.

The area of heat flux intake ($A_t$) for our bundle of 1 inch heat pipes given a outer radius of $r_c = 1.67$ cm and take $N_a = 120$ pipes of length $L_c = 916$ cm is given by the equation:

$$A_t = N_a(2\pi r_c L_l) = 1.15 \times 10^6 \text{cm}^2$$

The energy input to the system is calculated from the relationship $Q_t = \epsilon Q_s A_t$ where $\epsilon$ is the effectiveness factor of heat transfer from the geothermal source to the input heat pipes. Assuming $\epsilon = 0.9$, then $Q_t = 4.34 \times 10^6$ watts.

The energy output is then the thermal efficiency times the input, $P_t = N_t Q_t = 1$ megawatt.

We can calculate the total number of couples $N_t$ theoretically possible from the relationship:

$$N_t = Q_t/Q_a$$

$Q_t = 4.34 \times 10^6$ watts
$Q_a = 1.52 \times 10^3$ watts and
$N_t = 2855$ couples.

The number of couples per pipe is 23.8 couples/pipe. So if we use 23 couples/pipe, the number of couples is $$N_t = (23)(120) = 2760 \text{ couples}$$

and the power output is $$P_t = N_t P_{opt} - 1 \text{ megawatt.}$$

We continue to add to the annulus, whose outer radius is $r_o = 2.32$ cm $= 0.914$ in.

| | |
|---|---|
| Thermoelectric annulus, outer radius | .914 in. |
| Series conductors (metal) | .005 in. |
| Electrical insulation | .005 in. |
| Heat sink inner pipe thickness | .145 in. |
| Heat sink reflux area inner radius | 1.069 in. |

So we may use 2½ inch pipe for the outer pipe of the heat sink reflux area, which has an outer diameter of 2.875 in., and thus a radius of 1.438 in.

To compute the area occupied by these pipes, a full 360° of pipe takes four triangles of area $\sqrt{3}/2\ r^2$ each, so that area occupied per pipe is $2\sqrt{3}\ r^2 = 3.46 r^2$.

Then the area occupied by all of the pipes in the well is $$A_t = N_a 2\sqrt{3}\ r^2 = 858 \text{ in}^2$$

The area of the well is $A = \pi r^2$, so the radius of the well ($R_w$) to accommodate the pipe plus the area needed at the edge of the cluster, is slightly larger than 16.5 in.

So the well casing inner diameter must be slightly larger than 33 in. or about 2.78 ft. This is somewhat bulky, but reducing the size of the heat intake pipes will reduce the size of the well required, as will be discussed below.

The length of the generator assembly $L_g$ is $N_t(L_p + L_n)$ plus 10 percent for insulation between the thermoelectric elements, or approximately $$L_g = 96 \text{ ft.}$$

Thus, with 30 ft. at each end for heat exchangers, the dimensions of the entire assembly are 2.78 ft. diameter, 156 ft. length.

Finally, we consider the output of the series-parallel array which is the output characteristics of the well. We have 2760 couples, 0.183 volts/couple, 120 pipes, and 23 couples/ pipe.

If we want at least 25 volts output, we can add in a series connection the couples on six pipes. We then have $N_c = 6(23) = 138$ couples/branch, and the voltage output is $V_t = (0.183 \text{ v/couple})(138 \text{ couples}) = 25.3$ volts.

The number of branches is then $$N_b = N_t/N_c = 20 \text{ branches}$$

and the current output is $$I_t = N_b I_{opt} = 3.96 \times 10^4 \text{ amps}$$

The output resistance which must be matched by the input resistance of the D.C. to A.C. convertors, to create the proper loading for maximum conversion of available thermal energy to electric power, the basis for these calculations, is given by the relationship:

$$R_t = N_c/N_b = M_{opt} R_c = 6.35 \times 10^{-4} \text{ ohms}$$

Note that the distribution of array output power into a combination of voltage, current and resistance was arbitrarily chosen by the selection of one of them, and could be selected otherwise.

The well output characteristics are thus estimated to be:

| | |
|---|---|
| $P_t = 1$ M wt | Electric output power |
| $V_t = 25$ v | Arbitrary selection of output voltage, current and resistance combination. |
| $I_t = 4 \times 10^4$ amps | |
| $R_t = 6.3 \times 10^{-4}$ ohms | |
| 2.8 ft. | Well diameter - can be reduced by the use of a larger number of smaller heat pipes. |
| 160 ft. | Power assembly length |
| 120 | Number of annuli pipes |
| $N_t = 2760$ | Number of thermocouples |

Thus we have completed a first run-through of some of the calculations, and illustrated the use of the equations involving the thermoelectric material. But these results are not adequate even for preliminary specifications. The calculations must be reiterated in conjunction with their relationship to other factors not yet considered, and this will improve the performance of the design.

The maximum permissible current flow density figure used may not be realistic, necessitating a reworking of the design. (The semi-metallic nature and low resistivities of the modified silicides would seem to imply an order of magnitude greater electron flux capacity than other semiconductors.)

The most important parameter to consider next is the heat transport capability of the reflux tube heat pipes. To begin studying the relationship of variables, we assumed the use of 1 inch heat intake pipes. This resulted in a heat transport per pipe of $(4.34 \times 10^3$ kilowatts/120 pipes$) = 36.2$ kilowatts/pipe.

This is a reasonable amount for a one inch horizontal, liquid metal heat pipe; but for a vertical, gravity assisted reflux tube and heat pipe combination, it probably represents an amount much less than capacity. A minimum diameter for these pipes, to handle the available heat flux in the geothermal media, will have to be established. Smaller pipes, used in correspondingly greater numbers, will result in a larger area for heat reflux intake, and thus a larger output for the system. Small heat source pipes will also increase the area for heat flux through the convertors, thus permitting a smaller diameter well with the same output. The size of the intake heat pipes is thus critical.

A detailed study will have to be made of heat transport characteristics of every point in the complex thermal path. Some factors to consider are:

1. The flow characteristics of the aquifier steam through permeable rock (typically 19 percent porosity) and through gas stream cavities which might form above and contiguous with magma reservoirs.

2. The input heat exchangers which result from insertion of heat intake pipes into the aquifier, with attention to convection over the pipes and consideration of the internal heat transport characteristics stated below.

3. The heat transport characteristics of both the heating and cooling reflux pipes.
   a. Flow rate and sonic limitations of the gas and liquid phases.
   b. The proper combination of liquid metals for heating and the proper combination of coolants to achieve suitable boiling points of the mixture.
   c. Boiling phase heat transfer.
   d. Condensing phase heat transfer (which might be more critical than the boiling phase).
   e. Equalibrium temperatures which develop in the source and sink pipes as a result of the entire thermal process.
   f. The temperature drop along the source and sink pipes in the generator section. Since the source temperature drops going up the generator section, and the sink temperature increases going down the generator, the temperature differential across the convertors may not vary greatly.

4. The waste heat output heat exchanger which results from the converter heat sink tubes rising past the generator section of the cooling area of the well.

5. The characteristics and the mass flow rate and heat transport requirments of the circulating coolant which receives heat waste from the bundle of heat sink reflux heat pipes. See the discussion below on the system waste heat removal heat sink.

A study will also have to be made concerning some critical parameters of the thermoelectric and associted materials.

1. A precise determination will have to be made of the maximum permissible current flow density for the thermoelectric material selected. If this proves not to be a limiting factor, the convertor dimensions will have to be chosen to provide sufficient thermocouples to distribute among the heat pipes, and provide sufficient series connections for the desired series-parallel array for the D.C. to A.C. generators.

2. A determination will have to be made of the thermal expansion and mechanical stress properties of the thermoelectric materials, in combination with the electrical insulation, series condutors, the metals between which they are contained, and the thermal insulators separating the convertors. The desired compression of the thermoelectric material under thermal expansion will affect the choice and dimensions of all the above materials.

3. A determination will have to be made of the effect of interfaces of the semiconductors, ceramic electrical and thermal insulations, and metals. Considerations will have to be given to
   a. Interface resistances, electrical and thermal
   b. Methods of joining materials.

4. The input requirments for optimum performance of the D.C. to A.C. convertors (oscillators may be considered, as may the desirability or feasibility of their in situ use. A combination of oscillators, filters, current limiters, and voltage regulators operates with 93 percent efficiency, but may not handle large power loads.)

5. The type of series-parallel array will have to be determind, with consideration or redundancy or multidimensional arrays, and the effect of an array of convertors operating under differing conditions of input and reliability.

All of these are standard procedures, but in this case are complexly interrelated.

This analysis has just served to map out the problems. When the above optimizations are performed, a good workable system should result.

The optimum heat source for the overall system is an aquifer associated with a magmatic crustal intrusion. Surveys of ground magnetic, aeromagnetic, gravity, seismic groundnoise, microearthquakes, resistivity, infrared, and a variety of other techniques may be used to map out the system. A computer simulation may then be used to determine the thermal input that will result from insertion of a heat sink in the heat flux thermal field. A well drilled through impermeable rock to the porous aquifer, and sealed (as with lead) will separate heat source from heat sink by the insulating rock.

The optimum heat sink for the overall system will be closed system circulating fluid. Since waste heat from the generator constitutes three-quarters of the heat input to the system, there is ample waste heat to drive the circulating coolant without detracting from electrical energy output.

The coolant will fall down the well by gravity and rise as gas. The waste heat may be disposed of by:
   a. A radiator on the surface.
   b. Utilizing it on the surface, for additional energy, thus increasing the overall efficiency of the system.
   c. Convecting and conducting it away as it rises far up the well shaft. This constitutes a large reflux tube taking heat from the bundle of small heat sink tubes as a heat exchanger. With a coolant such as water, the circulating coolant need not be in a special container, since small losses through joints in the well casing may be replaced from the surface or from underground water.

Thermoelectric geothermal energy extraction will operate efficiently at temperatures reached by contemporary geothermal well drilling extensively around the world. It may thus be used immediately as an additional energy source.

I claim:

1. An in situ system for converting geothermal energy into electricity including a well drilled from ground surface into a high-temperature underground geological strata, comprising in combination,
   a. a first high-temperature heat pipe structure longitudinally aligned parallel the axis of said well having a lower section thermally coupled to said high-temperature geological strata and an upper end section extending toward the ground surface,
   b. a second low-temperature heat pipe structure longitudinally aligned parallel the axis of said well having a lower end section coaxially receiving the upper end section of said high-temperature heat pipe structure defining an annular volume between the upper end section of the high-temperature heat pipe structure and the lower surrounding end section of the low-temperature heat pipe structure, c. means for cooling said second low-temperature heat pipe structure, d. conversion means positioned within said annulus defined between the upper end section of said high-temperature heat pipe structure and the lower surrounding end section of said low-temperature heat pipe structure for thermally coupling said first high-temperature heat pipe structure to said second low-temperature heat pipe structure and for generating an electric current responsive to a temperature difference between said first and second heat pipe structures, and e. means connected to said conversion means for conducting said generated electrical current to the ground surface.

2. The system of claim 1 wherein a fluid medium thermally couples said high temperature heat pipe structure to said high temperature geological strata.

3. The system of claim 2 wherein said energy conversion means generate direct electrical current responsive to the temperature difference between said high and low temperatures heat pipe structures, and further including means disposed on the ground surface electrically connected to said means for conducting said generated electrical current to the ground surface for converting said direct electrical current into alternating electrical current.

4. The system of claim 3 further defined in that there are a plurality of said high temperature heat pipe structures and a plurality of said low temperature heat piipe structures within the well, said lower end section of each low temperature heat pipe structure being disposed around the upper end section of one high temperature heat pipe structure, said conversion means being disposed within the annuli defined between the upper end section of said high temperature heat pipe structures and the surrounding lower end sections of said low temperature heat pipe structures.

5. The system of claim 4 wherein said high and low temperature heat pipe structures are composed of electrically conductive structural materials.

6. The system of claim 5 further defined in that a well casing surrounds said high and low temperature heat pipe structures, said well casing being composed of an electrically conductive structural material, and wherein said well casing is electrically connected to said means for converting said direct electrical current into alternating electrical current, said well casing and said high temperature heat pipe structures providing in combination an electrical ground reference.

7. The system of claim 6 further defined in that said high temperature heat pipe structures are electrically insulated from said low temperature heat pipe structures and wherein said low temperature heat pipe structures are electrically insulated from said well casing.

8. The system of claim 6 wherein said means for conducting the generated electrical current from said conversion means to the ground surface comprise the combination of, a. an electrical output of said conversion means electrically connected to said low temperature heat pipe structures, b. a rod composed of an electrically connected to the upwardly extending end sections of the low temperature heat pipe structures and extending upwardly therefrom to the ground surface, and c. means for electrically insulating said rod along its entire length.

9. The system of claim 7 wherein said lower end sections of said low temperature heat pipe structures surrounding said upper end sections of said high temperature heat pipe structures are thermally and electrically insulated from said well casing, and wherein the remaining lengths of said low temperature heat pipe structures are electrically insulated from said well casing by a material which is conductive of thermal energy.

10. The system of claim 9 wherein said upper and lower end sections of said high temperature and low temperature heat pipe structures respectively are electrically insulated from said conversion means disposed in the annuli defined therebetween by a material which is conductive of thermal energy.

11. The system of claim 10 wherein said upper end sections of said high temperature heat pipe structures each have a clyndrical cross-section and wherein said surrounding lower end sections of said low temperature heat pipe structures each have an annular cross-section.

12. The system of claim 9 wherein said conversion means comprise a plurality of annular thermionic diodes disposed within said annuli defined between said upper end sections of said high temperature heat pipe structures and surrounding lower end sections of said low temperature heat pipe structures and insulating annular disks composed of a material having electrical and thermal energy insulation properties positioned within said annuli between said thermionic diodes.

13. The system of claim 12 wherein each thermionic diode includes, i. a cylindrical emitter electrode disposed around said upper end section of said high temperature heat pipe structure, said emitter electrode being electrically insulated from said high temperature heat pipe structure by a material which is conductive of thermal energy, ii. a cylindrical collector electrode disposed in a space-parellel relationship around said emitter electrode to define in combination with said emitter electrode an inter-electrode gap, said collector electrode being electrically insulated from said surrounding low temperature heat pipe structure by a material which is conductive of thermal energy, iii. a gas having a low ionization potential within said inter-electrode gap, said gas being confined within said inter-electrode gap by said insulating annular disks.

14. The system of claim 13 wherein said emitter electrodes are electrically connected to said high temperature heat pipe structure and said collector electrodes are electrically connected to said low temperature heat pipe structure.

15. The system of claim 13 wherein said plurality of thermionic diodes is divided into a plurality of generating units wherein each generating unit includes a plurality of contiguous thermionic diodes electrically connected in series with the emitter electrode of the first diode in said series connection being electrically connected to the high temperature heat pipe structure and the collector electrode of the last diode in said series connection electrically connected to said low temperature heat pipe structure.

16. The system of claim 15 wherein each insulating annular disk has a groove cut into its upper end surface, said groove communicating with said inter-electrode gap defined beweeen said emitter and collector electrodes of said diode immediately above said insulating annular disk for collecting liquid condensate of said gas.

17. The system of claim 15 wherein said high temperature heat pipe structures are composed of high temperature refractory metal materials of the class consisting of tungsten, tantalum, molybdenum and rhenium and wherein said low temperature heat pipe structures are also composed of high temperature refractory metal of the class consisting of tungsten, tantalum, molybdenum, rhenium and niobium.

18. The system of claim 17 wherein said emitter and collector electrodes are composed of high temperature refractory materials of the class consisting of tungsten, tantalum, molybdenum and rhenium.

19. The system of claim 18 wherein said materials having electrical and thermal insulating properties insulating said lower end sections of the low temperature heat pipe structures and forming said insulating annular disks are materials from the class consisting of thoria ($ThO_2$), zirconia ($ZrO_2$) and fosterite ($2MgO \cdot SiO_2$).

20. The system of claim 19 wherein said materials electrically insulating said emitter and collector electrodes of said thermionic diodes from said high temperature and low temperature heat pipe structures respectively and insulating said remaining section of the low temperature heat pipe structures, which materials are conductive of thermal energy, are from the class of materials consisting of alumina ($Al_2O_3$), berryllia (BeO) and boron nitride (BN).

21. The system of claim 20 wherein said gas within each inter-electrode gap of said thermionic diodes is from the class consisting of the metallic vapors of cesium, rubidium, barium and potassium.

22. The system of claim 21 wherein said metallic vapor within inter-electrode gap is cesium vapor and has a temperature ranging between 350° C to 450° C and a pressure ranging between five TORR to thirty TORR.

23. The system of claim 9 wherein said conversion means comprise a plurality of thermoelectric generators formed of alternating annular disk elements of P-type and N-type materials separated by annular insulating disks composed of a material having both electrical and thermal insulating properties, said P-type, N-type, disk elements and said insulating disks being disposed within said annuli defined between the upper end section of the high temperature heat pipe structures and the surroundning lower end sections of the low temperature heat pipe structures.

24. The system of claim 22 wherein said thermoelectric generators are electrically insulated from the high temperature heat pipe structures and the lower surrounding end section of the low temperature heat pipe structures by a material conductive of thermal energy.

25. The system of claim 24 wherein said plurality of thermal electric generators are divided into a plurality of generator units wherein the P-type and N-type elements of each unit are electrically connected in series by cylindrical bands of electrically conductive material, with the first disk element of said series connected unit being electrically connected to the high temperature heat pipe structure, and with the last disk element of said series connected generator units being electrically connected to said low temperature heat pipe structure, whereby said generator units within each annulus are electrically connected in parallel between the high temperature and low temperature heat pipe structures.

26. The system of claim 24 wherein said high temperature heat pipe structures are thermally coupled to a geological strata having a temperature below 600° C, and wherein said high temperature and low temperature heat pipe structures are composed of materials of the class consisting of high temperature alloys of steel.

27. The system of claim 26 wherein said materials electrically insulating said thermal electric generators from the high and low temperature heat pipes respectively and said material insulating said remaining sections of the low temperature heat pipe structures are from the class of materials consisting of alumina ($Al_2O_3$), berrylia (BeO) and boron nitride (BN).

28. The system of claim 27 wherein said insulative annular disks are composed of materials from the class consisting of zirconia and fosterite ($2MgO \cdot SiO_2$).

29. The system of claim 27 wherein said insulating annular disks separating the annular N-type and P-type elements are composed of a powdered and fibrous insulation of the class of materials consisting of Min-k, Dyna-Quartz and Micro-Quartz.

30. The system of claim 26 wherein said high temperature geological strata exists at temperatures greater than 600° C and wherein said high temperature heat pipe structres are composed of the common refractory metals of the class consisting of niobium, tungsten, tantalum, molybdenum and rhenium, and wherein said low temperature heat pipe structures are composed of metal temperature range refractory materials of the class consisting of high temperature steel alloys, niobium and molybdenum, and wherein said materials electrically insulating said thermionic generators from said high and low temperature heat pipe structures respectively electrically insulating said remaining sections of said low temperature heat pipe structures, which materials are thermally conductive, or from the class of materials consisting of alumina, berrylia, and boron nitride, and wherein said insulating annular disks are composed of materials from the class consisting of zirconia, fosterite and thoria, and wherein said P-type disk elements are composed of materials of the class consisting of modified silicides, $(CrMn)Si_2$ and PbTe and wherein said N-type annular disk elements are composed of materials of the class consisting of modified silicides, PbTe and CoSi.

31. The system of claim 4 wherein said high temperature heat pipe structures are divided into three sections, the upper end section, the lower end section and a middle section joining said upper and lower end sections, and wherein said middle sections are thermally insulated by materials of the class consisting of zirconia, fosterite and thoria.

32. The system of claim 3 further including a plurality of wells drilled from the ground surface to said high temperature underground geological strata, each well having said high temperature and low temperature heat pipe structures, said conversion means disposed in the annulus and defined between the upper end section and the lower end section of said high and low temperature heat pipe structures respectively, means for conducting said generated electrical current from said conversion means to the ground surface and said fluid media thermally coupling the high temperature heat pipe structure to the high temperature geological strata, and wherein said plurality of means for conducting said generated electrical current from said conversion means to the ground surface are electrically connected in parallel for driving said means for converting said direct electrical current into alternating electrical current.

33. The system of claim 3 further including a plurality of wells drilled from the ground surface to said high temperature underground geological strata, each well having said high and low temperature heat pipe structures, said conversion means disposed in the annulus defined between the upper end section and the lower surrounding end section of the high and low temperature heat pipe structures respectively, means for conducting said generated electrical current from said conversion means to the ground surface and said fluid medium thermally coupling the high temperature heat pipe structures to said high temperature geological strata, and wherein said means for conducting said generated electrical current from said conversion means to the ground surface are electrically connected in series for driving said means for converting said direct electrical current into alternative electrical current.

34. The system of claim 10 wherein said means for cooling said low temperature heat pipe structures comprises the combination of, a second fluid medium, means for circulating said second fluid medium into and out of a volume defined between said well casing and said low temperature heat pipe structures, whereby circulating said fluid mecium cools said low temperature heat pipe structures.

35. The system of claim 34 further including a low temperature geological strata above said high temperature geological strata, said well penetrating through low temperature geological strata to reach said high temperature strata and wherein said well casing has a plurality of perforations in its section which penetrates through said low temperature geological strata whereby said second fluid medium circulates into said low temperature geological strata.

36. The system of claim 34 wherein said high temperature geological strata comprises a molten magmatic liquid medium, and wherein said fluid medium thermally coupling said high temperature heat pipe structure to said high temperature geological strata is said molten magmatic medium.

37. The system of claim 36 further including means for preventing said molten magmatic material from extruding up said well toward the ground surface, 38. The system of claim 38 wherein said means for preventing said molten magmatic material from extrudding up the well toward the ground surface comprises a liquid medium filling said well from said region of molten magmatic medium upward to a point proximate said upper end section of said high temperature heat pipe structure, said liquid medium forming a liquid leg having a sufficient weight to counterbalance pressure forces tending to cause said magmatic material to extrude upward in said well towards the ground surface.

39. The system of claim 34 wherein said fluid medium thermally coupling said high temperature heat pipe structure to said high temperature underground geological strata comprises a liquid of the class of materials consisting of water and brine, and wherein said second fluid medium has a density substantially less than that of said liquid medium.

* * * * *

UNITED STATES PATENT OFFICE
CERTIFICATE OF CORRECTION

Patent No. 4,047,093     Dated September 6, 1977

Inventor(s) Larry Levoy

It is certified that error appears in the above-identified patent and that said Letters Patent are hereby corrected as shown below:

Column 4, line 65, the number "8" should read --18--;

Column 6, line 36, the word "ceramins" should read --ceramics--;

Column 6, line 36, the expression "$Al_2O_3$)" should read --($Al_2O_3$);

Column 12, line 59, the word "Powder" should read --Power--;

Column 12, line 68, the expression "$V = \emptyset_e - \emptyset c - V_d$" should read --$V = \emptyset_e - \emptyset_c - V_d$--;

Column 13, line 1, the expression "$T_{cmax}; 32(\frac{1}{8}c/\emptyset_e)T_e$" should read --$T_{c_{max}} = (\emptyset_c/\emptyset_e)T_e$--;

Column 13, line 7, the expression "$T_{e=}$" should read --$T_e=$--;

Column 13, line 11, the expression "$T_{c=}$" should read --$T_c=$--;

Column 13, line 23, the expression "$P_{es=}$" should read --$P_{es}=$--;

Column 13, line 23, the words "here to be" should read --taken here to be--;

Column 13, line 30, the word "of" should read --or--;

Column 13, line 31, the expression "$J_{sat=}$" should read --$J_{sat}=$--;

UNITED STATES PATENT OFFICE
CERTIFICATE OF CORRECTION

Patent No. 4,047,093                    Dated September 6, 1977

Inventor(s) Larry Levoy

It is certified that error appears in the above-identified patent and that said Letters Patent are hereby corrected as shown below:

Column 13, line 35, the expression "$A_{1=}$" should read --$A_1=$--;

Column 13, line 36, the expression "$cm^{-2°K-2}$" should read --$cm^{-2}\ °K^{-2}$--;

Column 13, line 67, the expression "$\phi_3$" should read --$\phi_e$--;

Column 16, line 10, the expression "$[\frac{1}{2}$" should read --$]\frac{1}{2}$--;

Column 16, line 17, the word "is" should read --its--;

Column 17, line 27, the expression "$4\pi r_5^2$" should read --$4\pi r_s^2$--;

Column 17, line 28, the expression "$r_5$" should read --$r_s$--;

Column 17, line 62, the word "th" should read --the--;

UNITED STATES PATENT OFFICE
CERTIFICATE OF CORRECTION

Patent No. 4,047,093   Dated September 6, 1977

Inventor(s)   LARRY LEVOY

It is certified that error appears in the above-identified patent and that said Letters Patent are hereby corrected as shown below:

Column 21, line 20, the expression "$\Sigma =$" should read -- $\epsilon =$ --;

Column 21, line 32, the expression "$N_{max} = \dfrac{M_{opt},311}{M_{opt}+\dfrac{T_c}{T_h}} \dfrac{\Delta T}{t_h}$" should read -- $N_{max} = \dfrac{M_{opt}-1}{M_{opt}+\dfrac{T_c}{T_h}} \dfrac{\Delta T}{T_h}$ --;

Column 21, line 37, the expression "$Z_{opt} = \dfrac{\bar{S}^2}{\sqrt{2}\sqrt{(k\rho)_p}+\sqrt{(k\rho)_n}}$"

should read -- $Z_{opt} = \dfrac{\bar{S}^2}{\left[\sqrt{(k\rho)_p}+\sqrt{(k\rho)_n}\right]^2}$ --;

Column 21, line 48, the expression "$P_{opt} = \dfrac{M_{opt}}{R_c}\left[\dfrac{\bar{S}\Delta}{1+M_{opt}}\right]T$"

should read -- $P_{opt} = \dfrac{M_{opt}}{R_c}\left(\dfrac{\bar{S}\Delta T}{1+M_{opt}}\right)^2$ --;

UNITED STATES PATENT OFFICE
CERTIFICATE OF CORRECTION

Patent No. 4,047,093      Dated September 6, 1977

Inventor(s) LARRY LEVOY

It is certified that error appears in the above-identified patent and that said Letters Patent are hereby corrected as shown below:

Column 22, line 16, the expression "$\left[\frac{k_n \rho_p}{k_p \rho_n}\right]^{\frac{1}{2}}$" should read --$\left[\frac{k_n \rho_p}{k_p \rho_n}\right]^{\frac{1}{2}}$--;

Column 23, line 30, the words "converter, more than" should read --convertor, or more than--;

Column 24, line 38, the expression "$\rho$av" should read --$\rho_{av}$--;

Column 27, line 22, the expression "$\Sigma =$" should read --$\epsilon =$--;

Column 27, line 26, the expression "$\Sigma N_c$" should read --$\epsilon N_c$--;

Page 5 of 6

UNITED STATES PATENT OFFICE
CERTIFICATE OF CORRECTION

Patent No. 4,047,093                    Dated September 6, 1977

Inventor(s)   LARRY LEVOY

It is certified that error appears in the above-identified patent and that said Letters Patent are hereby corrected as shown below:

Column 28, line 20, a paragraph was omitted. Insert omitted paragraph --(Note: if $L_p$ had been the smaller of $L_p$ and $L_n$, the term $\frac{\rho_p}{G_{opt}} + \rho_n$ would have been $(\rho_p + G_{opt}\rho_n)$, with the rest of the expression the same. Note also that satisfying the maxium permissible current density is independent of $L_n$ and $L_p$. --;

Column 29, line 2, the word "a" should read --an--;

Column 30, line 22, the expression "$R_t = N_c/N_b = M_{opt}R_c = 6.35 \times 10^{-4}$ ohms" should read
--$R_t = \frac{N_c}{N_b} M_{opt}R_c = 6.35 \times 10^{-4}$ ohms--;

Column 32, line 10, the word "determind" should read --determined

Column 32, line 10, the words "or redundancy" should read --of redundancy--;

UNITED STATES PATENT OFFICE
CERTIFICATE OF CORRECTION

Patent No. 4,047,093          Dated September 6, 1977

Inventor(s) Larry Levoy

It is certified that error appears in the above-identified patent and that said Letters Patent are hereby corrected as shown below:

Column 33, line 67, the words "electrically connected" should read --electrically conductive material electrically connected--;

Column 37, line 30, the words "alternative electrical" should read --alternating electrical--;

Column 38, line 23, the words "claim 38 wherein" should read --claim 37 wherein--.

Signed and Sealed this

Twenty-third Day of May 1978

[SEAL]

Attest:

RUTH C. MASON  
*Attesting Officer*

LUTRELLE F. PARKER  
*Acting Commissioner of Patents and Trademarks*